US011114764B2

(12) United States Patent
Noh et al.

(10) Patent No.: US 11,114,764 B2
(45) Date of Patent: Sep. 7, 2021

(54) ANTENNA MODULE

(71) Applicant: AMOTECH CO., LTD., Namdong-gu Incheon (KR)

(72) Inventors: Jin-Won Noh, Gyeonggi-do (KR); Hyung-Il Baek, Gyeonggi-do (KR); Beom-Jin Kim, Gyeonggi-do (KR); Ki-Sang Lim, Nam-gu Incheon (KR)

(73) Assignee: AMOTECH CO., LTD., Incheon (KR)

( * ) Notice: Subject to any disclaimer, the term of this patent is extended or adjusted under 35 U.S.C. 154(b) by 279 days.

(21) Appl. No.: 16/075,305

(22) PCT Filed: Feb. 3, 2017

(86) PCT No.: PCT/KR2017/001221
§ 371 (c)(1),
(2) Date: Aug. 3, 2018

(87) PCT Pub. No.: WO2017/135755
PCT Pub. Date: Aug. 10, 2017

(65) Prior Publication Data
US 2019/0067819 A1 Feb. 28, 2019

(30) Foreign Application Priority Data

Feb. 5, 2016 (KR) .................. 10-2016-0015180
Feb. 5, 2016 (KR) .................. 10-2016-0015182
Feb. 5, 2016 (KR) .................. 10-2016-0015185

(51) Int. Cl.
*H01Q 7/06* (2006.01)
*H01Q 1/22* (2006.01)
(Continued)

(52) U.S. Cl.
CPC ............. *H01Q 7/06* (2013.01); *H01Q 1/2208* (2013.01); *H01Q 1/52* (2013.01); *H01Q 1/521* (2013.01);
(Continued)

(58) Field of Classification Search
CPC ........... H01Q 7/06; H01Q 7/00; H01Q 1/521; H01Q 1/2208; H01Q 1/52; H01Q 1/243; H01Q 1/38; H04B 5/0075
See application file for complete search history.

(56) References Cited

U.S. PATENT DOCUMENTS

2014/0035793 A1* 2/2014 Kato .................. H01Q 7/06
343/867

FOREIGN PATENT DOCUMENTS

CN 101479886 A 7/2009
CN 101615717 A 12/2009
(Continued)

OTHER PUBLICATIONS

Office Action issued in Chinese Application No. 201780012735.8, dated Nov. 28, 2019.

*Primary Examiner* — Andrea Lindgren Baltzell
*Assistant Examiner* — Michael M Bouizza
(74) *Attorney, Agent, or Firm* — CL Intellectual LLC

(57) ABSTRACT

Disclosed is an antenna module that combines a vertical winding type antenna and a horizontal winding type antenna, thus minimizing a mounting space, manufacturing costs, and design considerations. That is, the antenna module combines the vertical winding type antenna and the horizontal winding type antenna to form an antenna for resonating in the first frequency band and the second frequency band, and an antenna for wireless power transmission, thus implementing antenna performance that is equal to or greater than that of the multi-band antenna composed of the horizontal winding type radiation pattern while minimizing a mounting space.

1 Claim, 25 Drawing Sheets

(51) Int. Cl.
*H01Q 1/38* (2006.01)
*H01Q 1/52* (2006.01)
*H01Q 7/00* (2006.01)
H01Q 1/24 (2006.01)
H04B 5/00 (2006.01)

(52) U.S. Cl.
CPC .............. *H01Q 7/00* (2013.01); *H01Q 1/243* (2013.01); *H01Q 1/38* (2013.01); *H04B 5/0075* (2013.01)

(56) References Cited

FOREIGN PATENT DOCUMENTS

| | | |
|---|---|---|
| CN | 105939162 A | 9/2016 |
| JP | 2009-112062 A | 5/2009 |
| KR | 10-2005-0040302 A | 5/2005 |
| KR | 10-2010-0000281 A | 1/2010 |
| KR | 10-2010-0010661 A | 2/2010 |
| KR | 10-2011-0025995 A | 3/2011 |
| KR | 10-1584555 B1 | 1/2016 |
| WO | 2010018546 A1 | 2/2010 |

\* cited by examiner

ANTENNA MODULE

CROSS-REFERENCE TO RELATED APPLICATIONS

This application is a National Stage of International patent application PCT/KR2017/001221, filed on Feb. 3, 2017, which claims priority to foreign Korean patent application Nos. KR 10-2016-0015180, 10-2016-0015182, and 10-2016-0015185 filed on Feb. 5, 2016, the disclosures of which are incorporated by reference in their entireties.

FIELD OF THE INVENTION

The present disclosure relates to an antenna module, and more particularly, to an antenna module built in a portable terminal and for transmitting/receiving data for information exchange and electronic payment with other portable terminals, and for transmitting/receiving wireless power for wireless charging of the portable terminal.

BACKGROUND

As technology develops, portable terminals such as a smart phone, a tablet, and a laptop are required to have near field wireless communication function for data exchange with other portable terminals together with their basic function.

Accordingly, the portable terminal is mounted with a Bluetooth antenna and a Near Field Communication (NFC) antenna used for data exchange using near field communication, a Magnetic Secure Transmission (MST) antenna for electronic payment, a Wireless Power Consortium (WPC) antenna for wireless power transmission, etc.

However, there is a problem in that the portable terminal has an insufficient space for mounting the antenna module in the trend of miniaturization and thinning due to the enhanced portability and the design requirement.

Meanwhile, the portable terminal increasingly applies a cover of a metal material (hereinafter, referred to as a metal cover) in terms of design.

There is a problem in that the metal cover induces the magnetic field in the direction opposite to the magnetic field formed in the antenna module to cancel near field wireless communication (e.g., an NFC signal, an MST signal), thus reducing the performance of the near field wireless communication of the portable terminal.

Accordingly, the antenna module manufacturers have been researching and developing an antenna module having the performance of the near field wireless communication at a certain level or more even when a metal cover is applied, while minimizing the use of the space by integrating a plurality of antenna modules.

For example, a structure has been proposed in which radiation patterns of an NFC antenna module and an MST antenna module are formed on the same plane to constitute an integral antenna module, and a slit or an opening portion overlapped with the radiation patterns is formed on the metal cover. In this time, generally, the radiation patterns of the NFC antenna module and the MST antenna module are formed in the loop shape in which the radiation patterns are wound in the horizontal direction (hereinafter, referred to as a horizontal winding) on one surface of a magnetic sheet.

The NFC antenna module resonates at a frequency of about 13.56 MHz, and the MST antenna module resonates at a frequency of about 10 kHz or less. That is, since the NFC antenna module is relatively a high frequency, the inductance of about 1 to 3 µH is required, and since the MST antenna module is relatively a low frequency, an inductance of about 15 µH or more is required.

As a result, the radiation area of the MST antenna module, which requires a relatively high inductance (i.e., a relatively low frequency), is formed to have a wider area than the radiation area of the NFC antenna module.

In addition, upon integration of the NFC antenna module and the MST antenna module, when the spacing interval between the radiation patterns is sufficiently not obtained, antenna performance is reduced due to signal interference.

Accordingly, there is a problem in that in the conventional antenna module, it is difficult to minimize the mounting space because the size of the antenna module becomes increased in order to obtain the radiation area at a certain level or more upon integration thereof.

In addition, there is a problem in that the portable terminal to which the metal cover is applied requires a plurality of slits or opening portions depending on the mounting location when the mounting area of the antenna module increases, such that the manufacturing process of the portable terminal becomes complicated and thereby the manufacturing costs increase.

In addition, there is a problem in that the portable terminal needs to consider a slit or an opening portion when producing the metal cover, thus restricting appearance design.

SUMMARY OF THE INVENTION

The present disclosure is intended to solve the above problems, and an object of the present disclosure is to provide an antenna module, which combines a vertical winding type radiation pattern and a horizontal winding type radiation pattern to minimize a mounting space, manufacturing costs, and design considerations.

For achieving the object, an antenna module in accordance with a first embodiment of the present disclosure includes a magnetic sheet; a first antenna resonating in a first frequency band, and located to be biased to one short side of the magnetic sheet; and a second antenna spaced apart from the first antenna to resonate in a second frequency band, and located to be biased to the other short side of the magnetic sheet.

The magnetic sheet can be formed with a material that the region where the first antenna is formed has a higher magnetic permeability than the region where the second antenna is formed, and can be formed with a material that the region where the second antenna is formed has a lower loss rate than the region where the first antenna is formed.

The magnetic sheet can include a first region where the first antenna is formed; a second region formed with a wider area than the first region, and where the second antenna is formed; and a third region interposed between the first region and the second region to separate the first antenna and the second antenna. In this time, the third region can be formed with an opening portion.

The magnetic sheet can include a first magnetic sheet where the first antenna is formed, and a second magnetic sheet located to be spaced apart from the first magnetic sheet, and where the second antenna is formed; and the second magnetic sheet can be formed with a wider area than the first magnetic sheet.

The first antenna can include a first radiation pattern located on the upper surface of the magnetic sheet; a second radiation pattern located on the lower surface of the magnetic sheet; a first connection pattern located on one side surface of the magnetic sheet, and connected to one end of the first radiation pattern and one end of the second radiation pattern; and a second connection pattern located on the other side surface of the magnetic sheet, and connected to the other end of the first radiation pattern and the other end of the second radiation pattern to form a vertical winding type radiation pattern wound in the vertical direction of the magnetic sheet.

The first antenna can include a first circuit board where a first radiation pattern is located, a second circuit board where a second radiation pattern is located, and a first adhesion layer interposed between the first circuit board and the second circuit board; and the first adhesion layer can form a receiving space formed in the pocket shape having at least one side opened to receive the magnetic sheet.

The first antenna can be a horizontal winding type radiation pattern wound on the upper surface of the magnetic sheet in the horizontal direction thereof.

The second antenna can include a third radiation pattern located on the upper surface of the magnetic sheet; a fourth radiation pattern located on the lower surface of the magnetic sheet; a third connection pattern located on one side surface of the magnetic sheet, and connected to one end of the third radiation pattern and one end of the fourth radiation pattern; and a fourth connection pattern located on the other side surface of the magnetic sheet, and connected to the other end of the third radiation pattern and the other end of the fourth radiation pattern to form a vertical winding type radiation pattern wound in the vertical direction of the magnetic sheet.

The second antenna can include a third circuit board where a third radiation pattern is formed, a fourth circuit board where a fourth radiation pattern is formed, and a second adhesion layer interposed between the third circuit board and the fourth circuit board; and the second adhesion layer can form a receiving space formed in the pocket shape having at least one side opened to receive the magnetic sheet.

The antenna module can further include an upper circuit board located so that a first radiation pattern of the first antenna is biased to one short side thereof, and located so that a third radiation pattern of the second antenna is biased to the other short side thereof, a lower circuit board located so that a second radiation pattern of the first antenna is biased to one short side thereof, and located so that a fourth radiation pattern of the second antenna is biased to the other short side thereof, and an adhesion layer interposed between the lower surface of the upper circuit board and the upper surface of the lower circuit board; and the adhesion layer can form a receiving space formed in the pocket shape having at least one side opened to receive the magnetic sheet.

An antenna module in accordance with a first embodiment of the present disclosure can include a magnetic sheet, a first antenna located on the upper surface of the magnetic sheet to resonate in a first frequency band, and a second antenna located on the upper and lower surfaces of the magnetic sheet to resonate in a second frequency band; and the first antenna can be wound in the horizontal direction of the magnetic sheet, and the second antenna is wound in the vertical direction of the magnetic sheet. In this time, the antenna module can further include an upper circuit board located on the upper surface of the magnetic sheet, and a lower circuit board located on the lower surface of the magnetic sheet; and the first antenna can be wound along the outer circumference of the upper surface of the upper circuit board, and the second antenna can include a third radiation pattern formed on the upper surface of the upper circuit board, and a fourth radiation pattern formed on the lower surface of the lower circuit board; and the third radiation pattern can be located inside the inner circumference of the first antenna. Herein, the second antenna can further include a via hole penetrating the magnetic sheet to be connected to the third radiation pattern and the fourth radiation pattern.

An antenna module in accordance with a second embodiment of the present disclosure includes a magnetic sheet; an upper circuit board located on the upper surface of the magnetic sheet; a lower circuit board located on the lower surface of the magnetic sheet; a first antenna alternately located on the upper circuit board and the lower circuit board to be wound on the magnetic sheet in the vertical direction thereof; a second antenna located on the upper circuit board to be wound on the magnetic sheet in the horizontal direction thereof; and an antenna connection pattern having one end connected with the first antenna, and having the other end connected with the second antenna.

The first antenna can include a first upper radiation pattern located to be biased to one short side of the upper circuit board; a lower radiation pattern located to be biased to one short side of the lower circuit board; and a via connection pattern having one end connected with the first upper radiation pattern, and having the other end connected with the lower radiation pattern.

The second antenna can include a second upper radiation pattern formed in the loop shape of the upper circuit pattern, and located to be biased to the other short side of the upper circuit board.

The connection pattern can be located on the upper circuit board or the lower circuit board, has one end connected with one end of the first antenna, and has the other end connected with one end of the second antenna. In this time, the other end of the first antenna and the other end of the second antenna can be connected to a terminal, respectively.

The antenna module in accordance with the second embodiment of the present disclosure can further include an adhesion sheet interposed between the upper circuit board and the lower circuit board, and the adhesion sheet can form a pocket-shaped receiving space having at least one edge side of the entire edges opened to receive the magnetic sheet.

The antenna module in accordance with the second embodiment of the present disclosure can further include a branch pattern having one end connected with the first antenna and having the other end connected to a terminal different from the terminals to which the first antenna and the second antenna are connected.

The antenna module in accordance with a third embodiment of the present disclosure includes a magnetic sheet; an upper circuit board located on the upper surface of the magnetic sheet; a lower circuit board located on the lower surface of the magnetic sheet, a first antenna located on the upper surface of the upper circuit board, and wound along the outer circumference of the upper surface of the upper circuit board, a second antenna alternately located on the upper surface of the upper circuit board and the lower surface of the lower circuit board to be wound on the magnetic sheet in the vertical direction thereof, and a third antenna formed on the upper surface of the upper circuit board, and formed inside the inner circumference of the first antenna; and the second antenna formed on the upper surface of the upper circuit board can be formed inside the inner circumference of the first antenna.

The second antenna can include a second upper radiation pattern formed to be biased to one short side of the upper circuit board; a third upper radiation pattern formed to be biased to the other short side of the upper circuit board; a connection radiation pattern formed to be biased to one long side of the upper circuit board, and connected to the second upper radiation pattern and the third upper radiation pattern; a first lower radiation pattern formed to be biased to one short side of the lower circuit board; a second lower radiation pattern formed to be biased to the other short side of the lower circuit board; and a plurality of via connection patterns penetrating the upper circuit board and the lower circuit board to connect the second upper radiation pattern and the first lower radiation pattern, and the third upper radiation pattern and the second lower radiation pattern.

The first antenna can include the loop-shaped first upper radiation pattern wound along the outer circumference of the upper surface of the upper circuit board, and the second upper radiation pattern and the third upper radiation pattern can be located inside the inner circumference of the first upper radiation pattern.

The third antenna can include a fourth upper radiation pattern formed on the upper surface of the upper circuit board, and interposed between the second upper radiation pattern and the third upper radiation pattern.

The antenna module in accordance with the third embodiment of the present disclosure can further include an adhesion sheet interposed between the upper circuit board and the lower circuit board, and the adhesion sheet can form a pocket-shaped receiving space having at least one edge side of the entire edges opened to receive the magnetic sheet.

The magnetic sheet can include a first magnetic sheet located on the lower surface of the upper circuit board and having a groove formed on the region located on the lower surface of the third antenna; and a second magnetic sheet inserted into the groove of the first magnetic sheet to be located on the lower surface of the upper circuit board, and located on the region located on the lower surface of the third antenna. In this time, the magnetic sheet can be formed so that the thickness of the region located on the lower surface of the third antenna is thicker than the thicknesses of other regions.

The magnetic sheet can include a first magnetic sheet located on the lower surface of the upper circuit board; and a second magnetic sheet located on the lower surface of the first magnetic sheet, and located on the region located on the lower surface of the third antenna.

The magnetic sheet can include a first magnetic sheet located on the lower surface of the upper circuit board, and having a groove formed on the region formed on the lower surface of the third antenna, and a second magnetic sheet inserted into the groove formed on the lower circuit board and the groove formed on the first magnetic sheet to be located on the lower surface of the upper circuit board, and located on the region located on the lower surface of the third antenna; and the thickness of the second magnetic sheet can be formed to be thicker than the thickness of the first magnetic sheet.

The antenna module in accordance with the third embodiment of the present disclosure can further include an insertion circuit board interposed between the upper circuit board and the second magnetic sheet. In this time, the third antenna can include a fourth upper radiation pattern formed on the upper surface of the upper circuit board, and a third lower radiation pattern formed on the lower surface of the insertion circuit board; and the fourth upper radiation pattern and the third lower radiation pattern are connected through a plurality of via holes.

According to the present disclosure, it is possible for the antenna module to constitute the multi-band antenna by combining the vertical winding type radiation pattern and the horizontal winding type radiation pattern, thus implementing antenna performance equal to or greater than that of the multi-band antenna consisting of the horizontal winding type radiation pattern while minimizing the mounting space.

In addition, it is possible for the antenna module to constitute the antenna by combining the vertical winding type radiation pattern and the horizontal winding type radiation pattern, thus forming a radiation field on the front, rear, and side surfaces of the portable terminal to perform near field communication regardless of the directionality.

That is, since the conventional antenna module forms a radiation field only on the rear surface of the portable terminal, there is an inconvenience that the rear surface thereof needs to be adjacent to the communication object device for near field communication, while in the present disclosure, it is possible to form the radiation field in all directions (i.e., the side surface, the front surface, the rear surface) of the portable terminal, thus resolving the inconvenience of the conventional antenna module.

In addition, it is possible for the antenna module to constitute the multi-band antenna by combining the vertical winding type radiation pattern and the horizontal winding type radiation pattern, thus forming the radiation field in the direction in which the communication object is mainly located for each antenna to provide convenience for the use of near field communication of the portable terminal.

In addition, it is possible for the antenna module to locate the magnetic sheet of different materials on the first antenna and the second antenna, thus setting the material of the magnetic sheet depending upon resonance frequency bands of the first and second antennas to maximize the antenna performance of each antenna while minimizing the mounting space.

In addition, it is possible for the antenna module to constitute the multi-band antenna module by combining the vertical winding type radiation pattern and the horizontal winding type radiation pattern, thus minimizing the mounting space to implement the antenna performance through a single opening portion, and relatively simplifying the manufacturing process of the portable terminal to minimize an increase in manufacturing costs.

In addition, it is possible for the antenna module to constitute the multi-band antenna by combining the vertical winding type radiation pattern and the horizontal winding type radiation pattern, thus minimizing the appearance design constraints on the metal cover of the portable terminal depending upon the formation of the slit or the opening portion.

In addition, it is possible for the antenna module to constitute the antenna by combining the vertical winding type radiation pattern and the horizontal winding type radiation pattern, thus forming a wider radiation area and a greater inductance in the same area than the conventional antenna module that forms only the horizontal winding type radiation pattern to enhance the antenna performance.

In addition, it is possible for the antenna module to form a greater inductance than that of the conventional antenna module by winding the first antenna and the second antenna on the magnetic sheet in the vertical direction thereof, thus implementing the same or greater antenna performance in the small size than the conventional antenna module.

In addition, it is possible for the antenna module to constitute the antenna by combining the vertical winding type radiation pattern and the horizontal winding type radiation pattern, thus maximizing the recognition range and the antenna performance for each angle through the vertical winding type radiation pattern, and maximizing the recognition performance on the plane through the horizontal winding type radiation pattern.

In addition, it is possible for the antenna module to wind the first antenna and the second antenna on the magnetic sheet in the vertical direction thereof, thus implementing the performance of the NFC antenna and the performance of the MST antenna at a constant level or more regardless of the material (e.g., a metal material or a non-metal material) of the rear cover. That is, it is possible for the antenna module to maximize the recognition range and recognition rate regardless of the material of the rear cover.

In addition, it is possible for the antenna module to locate a different material or a different thickness from other antennas on the third antenna, thus maximizing the wireless power transmission efficiency and the transmission distance while minimizing the mounting space.

In addition, it is possible for the antenna module to locate the radiation pattern on both surfaces of the circuit board, and to connect the radiation patterns located on both surfaces thereof through the plurality of via holes to form the third antenna, thus minimizing the resistance of the third antenna to maximize the wireless power transmission efficiency and the transmission distance.

DETAILED DESCRIPTION

Figure 1:
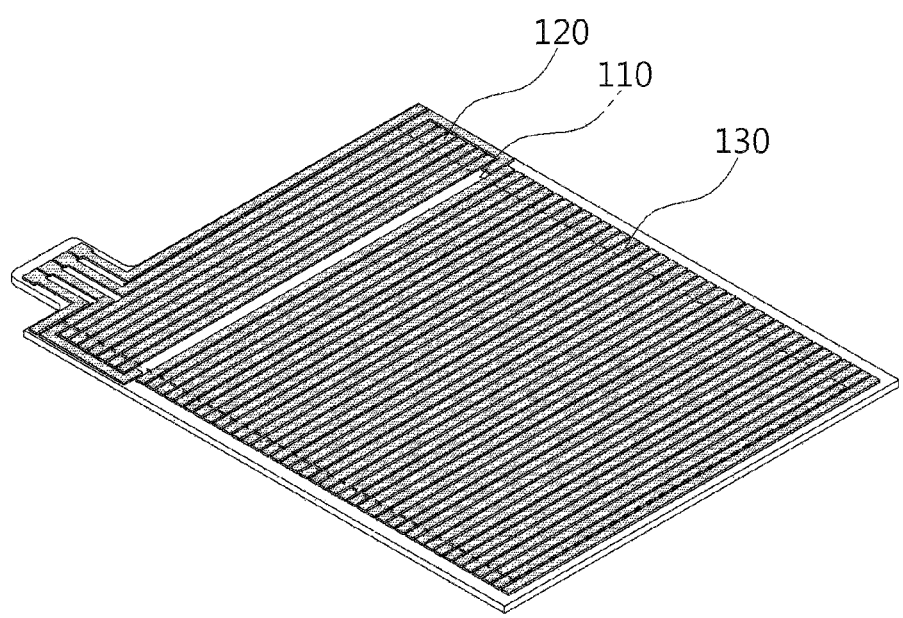
FIG. 1 is a diagram for explaining an antenna module in accordance with a first embodiment of the present disclosure.

Hereinafter, most preferred embodiments of the present disclosure will be described in detail with reference to the accompanying drawings so that those skilled in the art to which the present disclosure pertains can easily practice the technical spirit of the present disclosure. First, it is noted that, in adding reference numerals to components of each drawing, the same components are denoted by the same reference numerals whenever possible, even though they are illustrated in different drawings.

Referring to FIG. 1, an antenna module in accordance with a first embodiment of the present disclosure is configured to include a magnetic sheet 110, a first antenna 120, and a second antenna 130.

In this time, the first antenna 120 is an antenna resonating in a first frequency band, and the second antenna 130 is an antenna resonating in a second frequency band different from the first frequency band.

Herein, for example, the first frequency band is a Near Field Communication (NFC) frequency band resonating at a frequency of about 13.56 MHz, and the second frequency band is a Magnetic Secure Transmission (MST) frequency band resonating at a frequency of about 10 kHz or less.

The magnetic sheet 110 can be formed of any one selected from an iron-based amorphous sheet, a nanocrystalline sheet, a ferrite sheet, a polymer sheet, and a metal sheet that have a predetermined magnetic permeability and permittivity.

Figure 2:
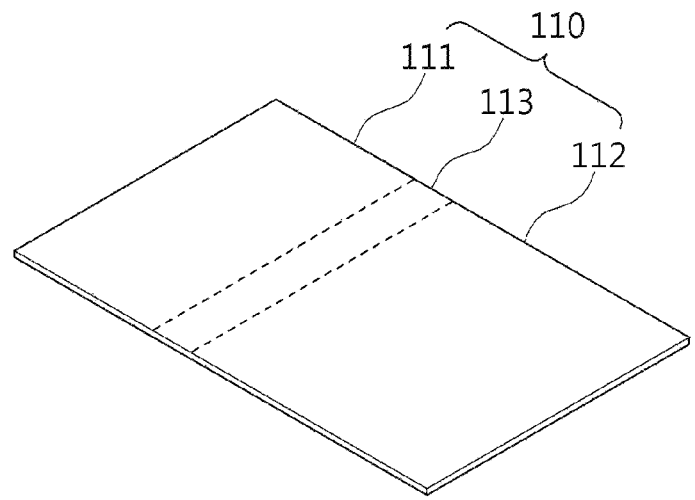
FIGS. 2 to 4 are diagrams for explaining a magnetic sheet of FIG. 1.

In this time, referring to FIG. 2, the magnetic sheet 110 can be divided into a first region 111, a second region 112, and a third region 113 depending on the locations where the first antenna 120 and the second antenna 130 are formed.

The first region 111 is a region where the first antenna 120 is formed as a partial region in the direction of one short side of the magnetic sheet 110.

The second region 112 is a region where the second antenna 130 is formed as a partial region in the direction of the other short side of the magnetic sheet 110. In this time, the second region 112 is formed to have a wider area than the first region 111 because the second antenna 130 operating as the MST antenna is formed thereon.

The third region 113 is a region for obtaining the spacing interval between the first antenna 120 and the second antenna 130 as a partial region between the first region 111 and the second region 112. In this time, the third region 113 is a region where any one of the first antenna 120 and the second antenna 130 is not formed thereon.

Herein, the first region 111 to the third region 113 can be formed of the same material, or any one region of the first region 111 and the third region 113 can be formed of a material different from the other regions.

For example, when the first antenna 120 is an NFC antenna and the second antenna 130 is an MST antenna, the first region 111 is formed of a material having a lower loss rate than the second region 112, and the second region 112 can be formed of a material having a higher magnetic permeability than the first region 111.

Figure 3:
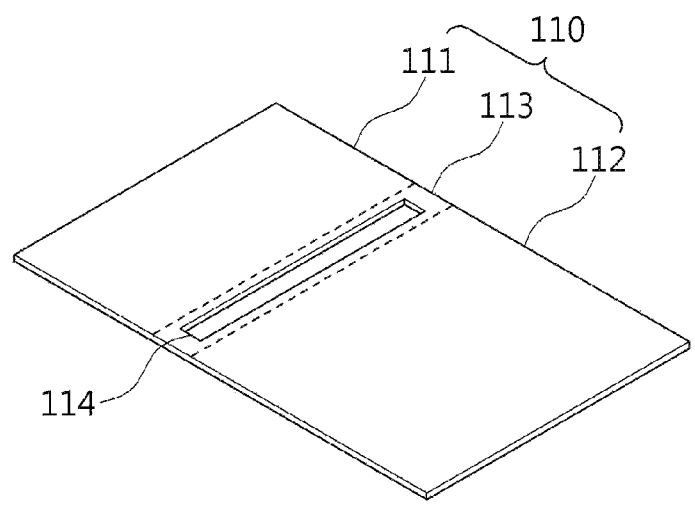

Referring to FIG. 3, an opening portion 114 can be formed in the third region 113. That is, the antenna module can be mounted on a portable terminal to overlap with a camera, a lighting LED, a speaker, etc. depending upon the design (shape) of the portable terminal.

Accordingly, the third region 113 can be formed with the opening portion 114 through which a camera, a lighting LED, and a speaker, etc. penetrate. In this time, the shape of the opening portion 114 can be changed depending upon the board penetrated, and can be formed to extend to the first region 111 and the second region 112.

Figure 4:
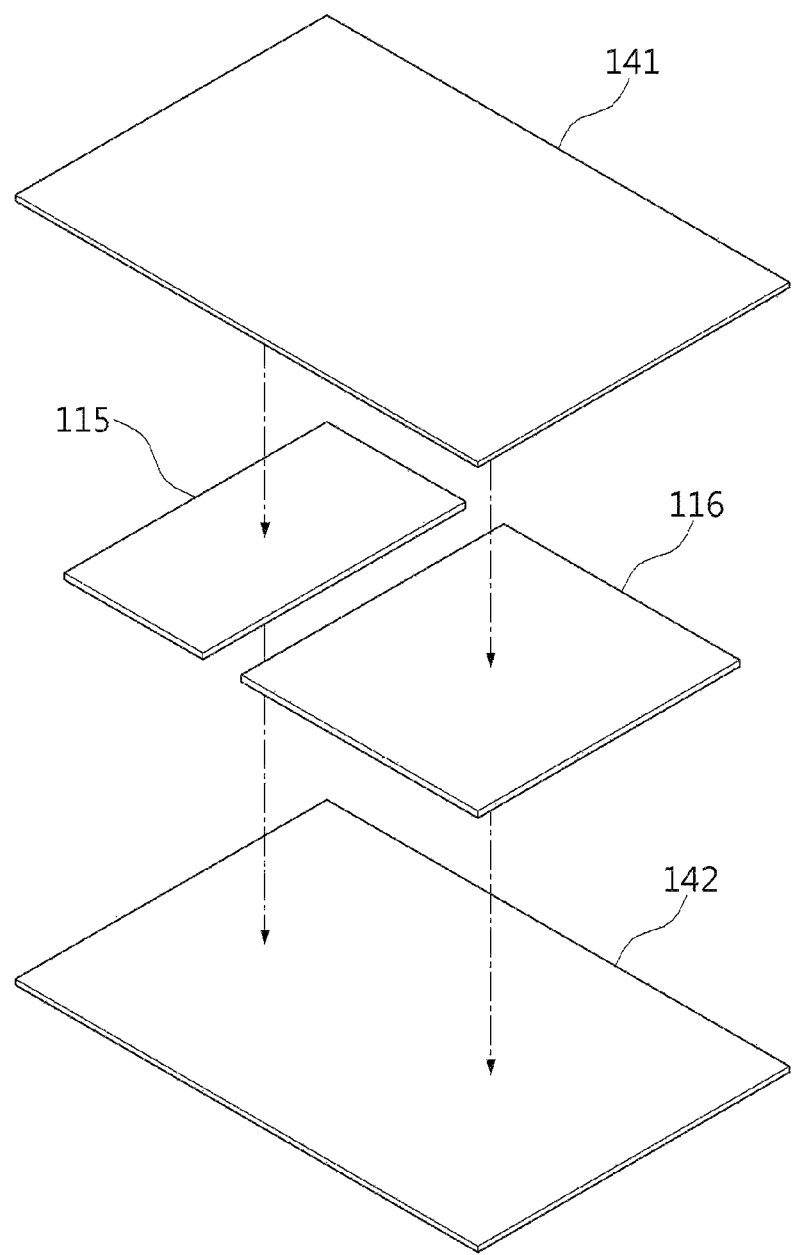

Referring to FIG. 4, the magnetic sheet 110 can be composed of a first magnetic sheet 115 and a second magnetic sheet 116 separated from each other.

The first magnetic sheet 115 is formed with the first antenna 120 as the configuration corresponding to the first region 111 described above.

The second magnetic sheet 116 is formed with the second antenna 130 as the configuration corresponding to the second region 112 described above.

In this time, the first magnetic sheet 115 and the second magnetic sheet 116 are located to be spaced apart from each other at a predetermined interval, and the spacing space between the first magnetic sheet 115 and the third magnetic sheet 110 is the configuration corresponding to the third region 113, and obtains the spacing interval between the first antenna 120 and the second antenna 130.

In this case, the first magnetic sheet 115 and the second magnetic sheet 116 are coupled through an upper protection sheet 141 and a lower protection sheet 142 to constitute the magnetic sheet 110. In this time, the first magnetic sheet 115 and the second magnetic sheet 116 can be formed with the first antenna 120 and the second antenna 130 after the protection sheet is adhered thereto.

Of course, the magnetic sheet 110 can be also configured by winding the first antenna 120 on the first magnetic sheet 115 and winding the second antenna 130 on the second magnetic sheet 116, and then adhering the upper protection sheet 141 and the lower protection sheet 142.

Figure 5:
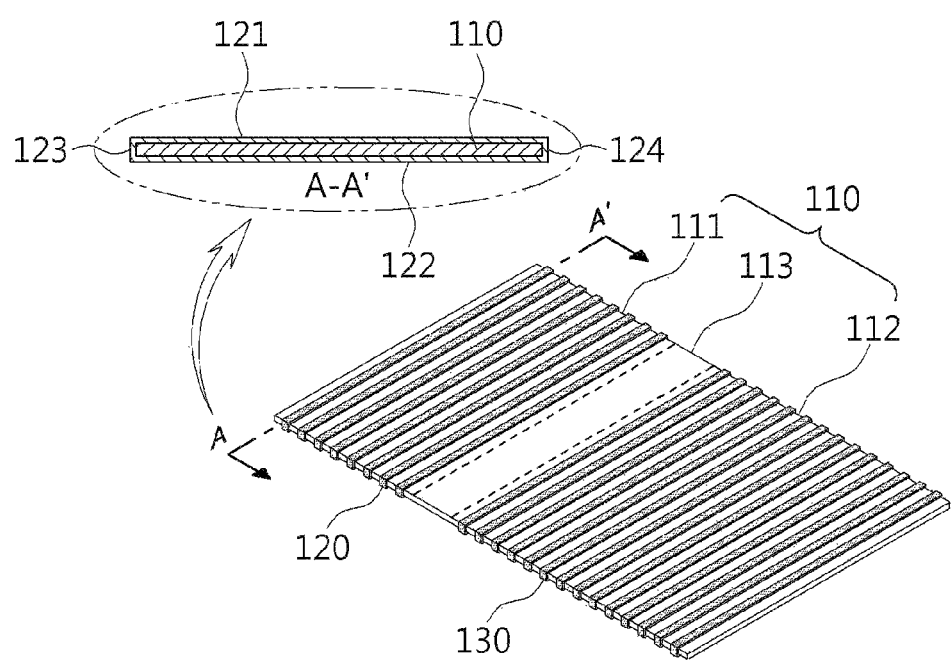
FIGS. 5 to 8 are diagrams for explaining a first antenna of FIG. 1.

The first antenna 120 is located to be biased toward one short side of the magnetic sheet 110 and wound in the vertical direction of the magnetic sheet 110. That is, referring to FIG. 5, the first antenna 120 can be composed of a wire and include a first radiation pattern 121, a second radiation pattern 122, a first connection pattern 123, and a second connection pattern 124.

In this time, although having described that in order to easily explain the first embodiment of the present disclosure, the first antenna 120 is divided into the first radiation pattern 121, the second radiation pattern 122, the first connection pattern 123, and the second connection pattern 124, it is not limited thereto and the first antenna 120 can be integrally formed.

The plurality of first radiation patterns 121 are formed to be spaced apart from each other on the upper surface of the first region 111. The plurality of first radiation patterns 121 are formed parallel to one short side thereof, and are formed to be spaced apart from each other at a predetermined interval.

The plurality of second radiation patterns 122 are formed to be spaced apart from each other on the lower surface of the first region 111. The plurality of second radiation patterns 122 are formed to have a predetermined inclination with one short side thereof, and are formed to be spaced apart from each other at a predetermined interval.

The plurality of first connection patterns 123 are formed on one side surface of the first region 111, have one end connected to the first radiation patterns 121, and have the other end connected to the second radiation patterns 122. In this time, the plurality of first connection patterns 123 are formed to be spaced apart from each other at a predetermined interval, and form a radiation pattern in the vertical direction of the magnetic sheet 110.

The plurality of second connection patterns 124 are formed on the other side of the first region 111, have one end connected to the first radiation patterns 121, and have the other end connected to the second radiation patterns 122. In this time, the plurality of second connection patterns 124 are formed to be spaced apart from each other at a predetermined interval, and form a radiation pattern in the vertical direction of the magnetic sheet 110.

The spacing interval of the first radiation patterns 121, the spacing interval of the second radiation patterns 122, the spacing interval of the first connection patterns 123, and the spacing interval of the second connection patterns 124 can be variously formed depending upon the size of the antenna module.

Figure 6:
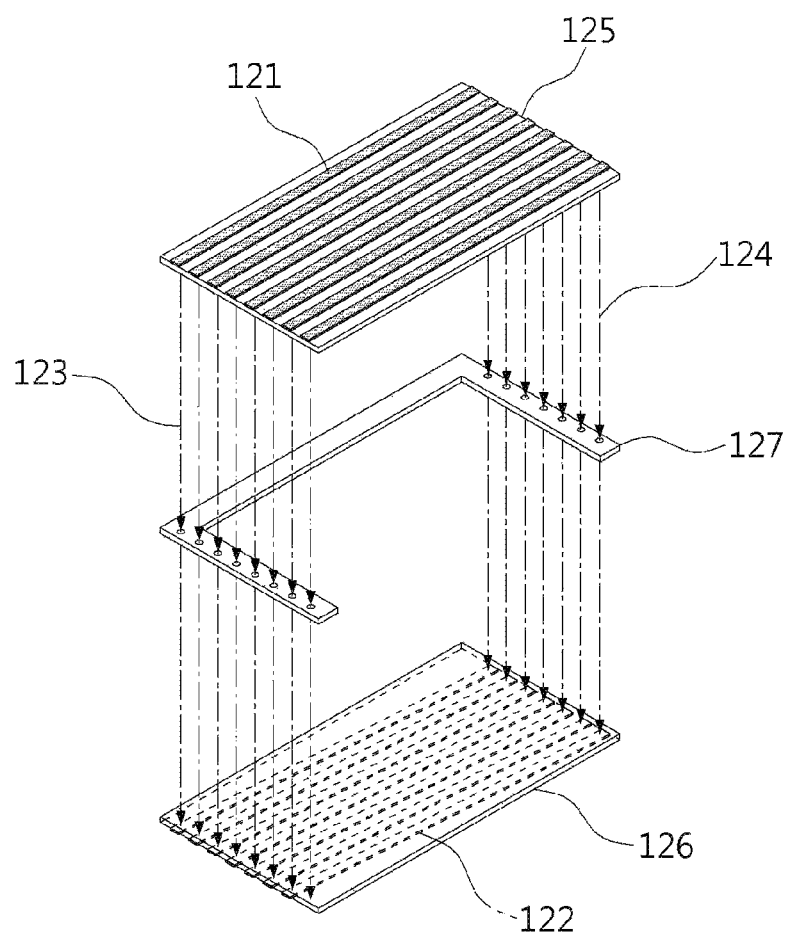
Figure 7:
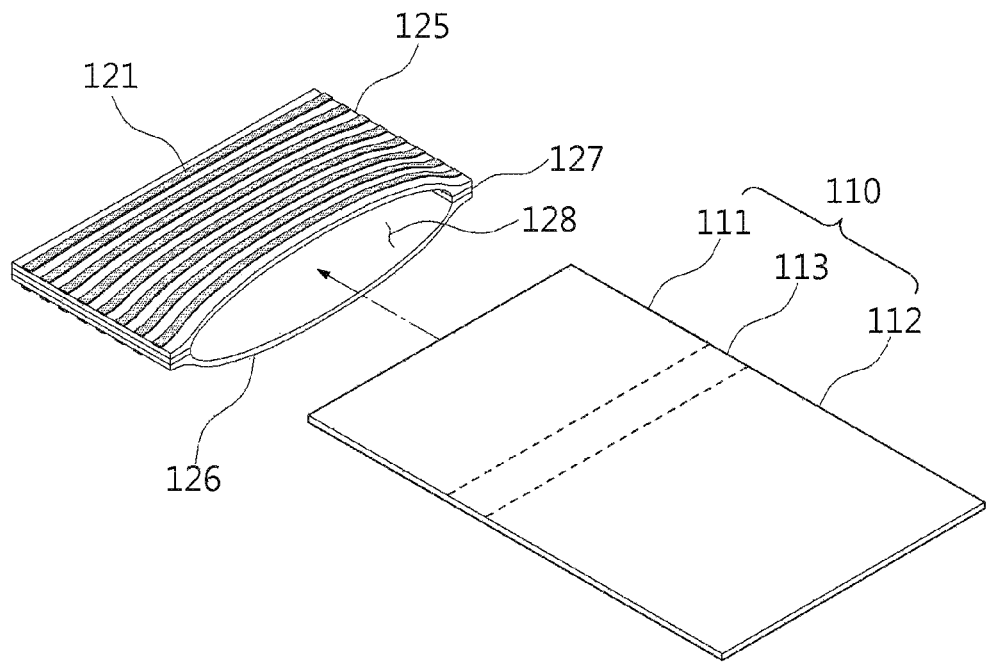

The first antenna 120 can be formed of a flexible printed circuit board. For example, referring to FIGS. 6 and 7, the first antenna 120 is configured to include a first circuit board 125 and a second circuit board 126.

The first circuit board 125 has the plurality of first radiation patterns 121 formed to be spaced from each other on the upper surface thereof. In this time, the plurality of first radiation patterns 121 are formed on the upper surface of the first circuit board 125 in the printing method.

The second circuit board 126 has the plurality of second radiation patterns 122 formed to be spaced apart from each other. In this time, the plurality of second radiation patterns 122 are formed on the upper surface of the second circuit board 126 in the printing method. The second circuit board 126 has the upper surface adhered to the lower surface of the first circuit board 125. The plurality of first radiation patterns 121 and the plurality of second radiation patterns 122 are connected through via holes.

In this time, although having described as an example that the radiation patterns are formed on the first circuit board 125 and the second circuit board 126 in the printing method, it is not limited thereto and any method of forming a circuit pattern in the method of manufacturing the general printed circuit board can be used.

The stacked body in which the first circuit board 125 and the second circuit board 126 are stacked can be formed with a receiving space 128 for receiving the magnetic sheet 110.

The receiving space 128 can be interposed between the first circuit board 125 and the second circuit board 126, and can be formed in the pocket shape having at least one side opened.

For this purpose, a first adhesion layer 127 can be interposed between the first circuit board 125 and the second circuit board 126. In this time, the first adhesion layer 127 can be a bonding sheet or a thermosetting adhesive agent. In addition, the first adhesion layer 127 can use any material as long as it can adhere the first circuit board 125 and the second circuit board 126 to each other.

The first adhesion layer 127 cannot be located on the partial edge side of the entire edges. For example, when the first circuit board 125 and the second circuit board 126 have the rectangular shape, the first adhesion layer 127 can be located on three sides except for one of the four sides, or can be located on two sides facing each other.

The magnetic sheet 110 is inserted into the receiving space 128 through one side where the first adhesion layer 127 is not located. In this time, as the first region 111 of the magnetic sheet 110 or the first magnetic sheet 115 is inserted into the receiving space 128, the plurality of first radiation patterns 121 are located on one surface of the magnetic sheet 110, and the plurality of second radiation patterns 122 are located on the other surface of the magnetic sheet 110.

The plurality of first radiation patterns 121 and the plurality of second radiation patterns 122 are connected to each other through the plurality of via holes to constitute one radiation body, and the configured radiation body forms a vertical winding type pattern winding the magnetic sheet 110 in the vertical direction thereof. Herein, since the plurality of via holes correspond to the first connection pattern 123 and the second connection pattern 124, they are denoted by the same reference numerals.

Figure 8:
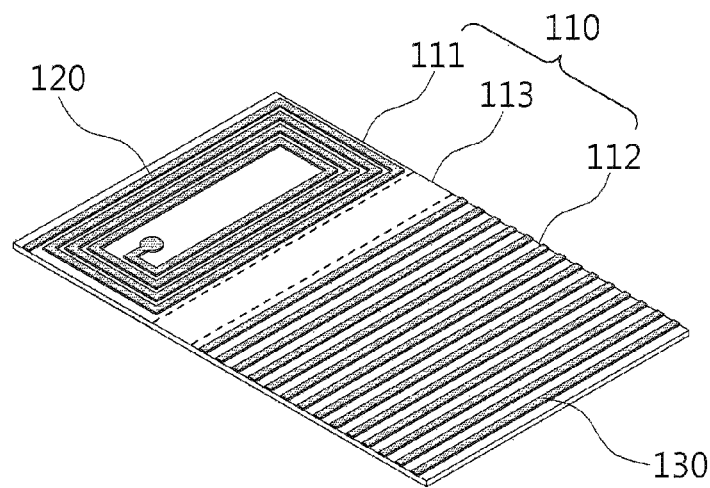

Referring to FIG. 8, the first antenna 120 can be also wound in the horizontal direction on one surface of the magnetic sheet 110. That is, since the first antenna 120 operates as an NFC antenna, the first antenna 120 can be formed with a relatively small radiation area compared to the second antenna 130. Accordingly, the second antenna 130 can be formed in the horizontal winding type radiation pattern that is wound on the first region 111 of the magnetic sheet 110 or on the upper surface of the first magnetic sheet 115 in the horizontal direction thereof.

Figure 9:
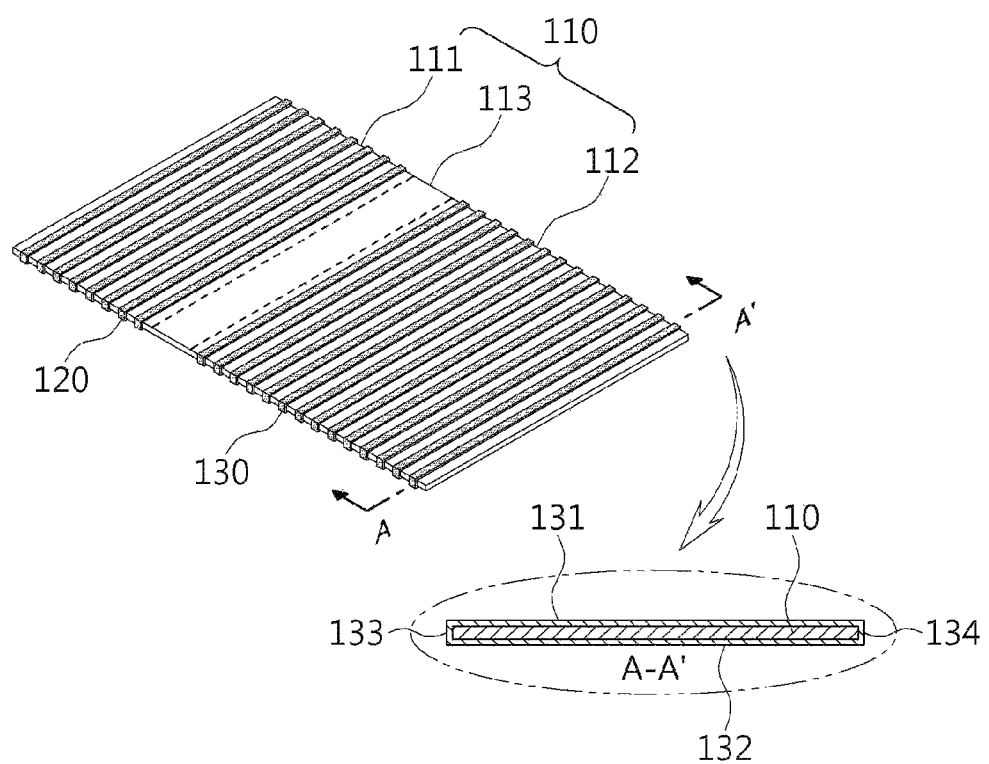
FIGS. 9 to 11 are diagrams for explaining a second antenna of FIG. 1.

The second antenna 130 is wound in the vertical direction on some regions in the direction of the other short side of the magnetic sheet 110. That is, referring to FIG. 9, the second antenna 130 can be composed of a wire and include a third radiation pattern 131, a fourth radiation pattern 132, a third connection pattern 133, and a fourth connection pattern 134.

In this time, although having described that in order to easily explain the first embodiment of the present disclosure, the second antenna 130 is divided into the third radiation pattern 131, the fourth radiation pattern 132, the third connection pattern 133, and the fourth connection pattern 134, it is not limited thereto and the second antenna 130 can be integrally formed.

The plurality of third radiation patterns 131 are formed to be spaced apart from each other on the upper surface of the second region 112. The plurality of third radiation patterns 131 are formed parallel to one short side of the magnetic sheet 110, and are formed to be spaced apart from each other at a predetermined interval.

The plurality of fourth radiation patterns 132 are formed to be spaced apart from each other on the lower surface of the second region 112. The plurality of fourth radiation patterns 132 are formed to have a predetermined inclination with one short side of the magnetic sheet 110, and are formed to be spaced apart from each other at a predetermined interval.

The plurality of third connection patterns 133 are formed on one side surface of the second region 112, have one end connected with the third radiation pattern 131, and have the other end connected to the fourth radiation pattern 132. In this time, the plurality of third connection patterns 133 are formed to be spaced apart from each other at a predetermined interval, and form a radiation pattern in the vertical direction of the magnetic sheet 110.

The plurality of fourth connection patterns 134 are formed on the other side surface of the second region 112, have one end connected with the third radiation pattern 131, and have the other end connected to the fourth radiation pattern 132. In this time, the plurality of fourth connection patterns 134 are formed to be spaced apart from each other at a predetermined interval, and form a radiation pattern in the vertical direction of the magnetic sheet 110.

The spacing interval of the third radiation patterns 131, the spacing interval of the fourth radiation patterns 132, the spacing interval of the third connection patterns 133, and the spacing interval of the fourth connection patterns 134 can be variously formed depending on the size of the antenna module.

Figure 10:
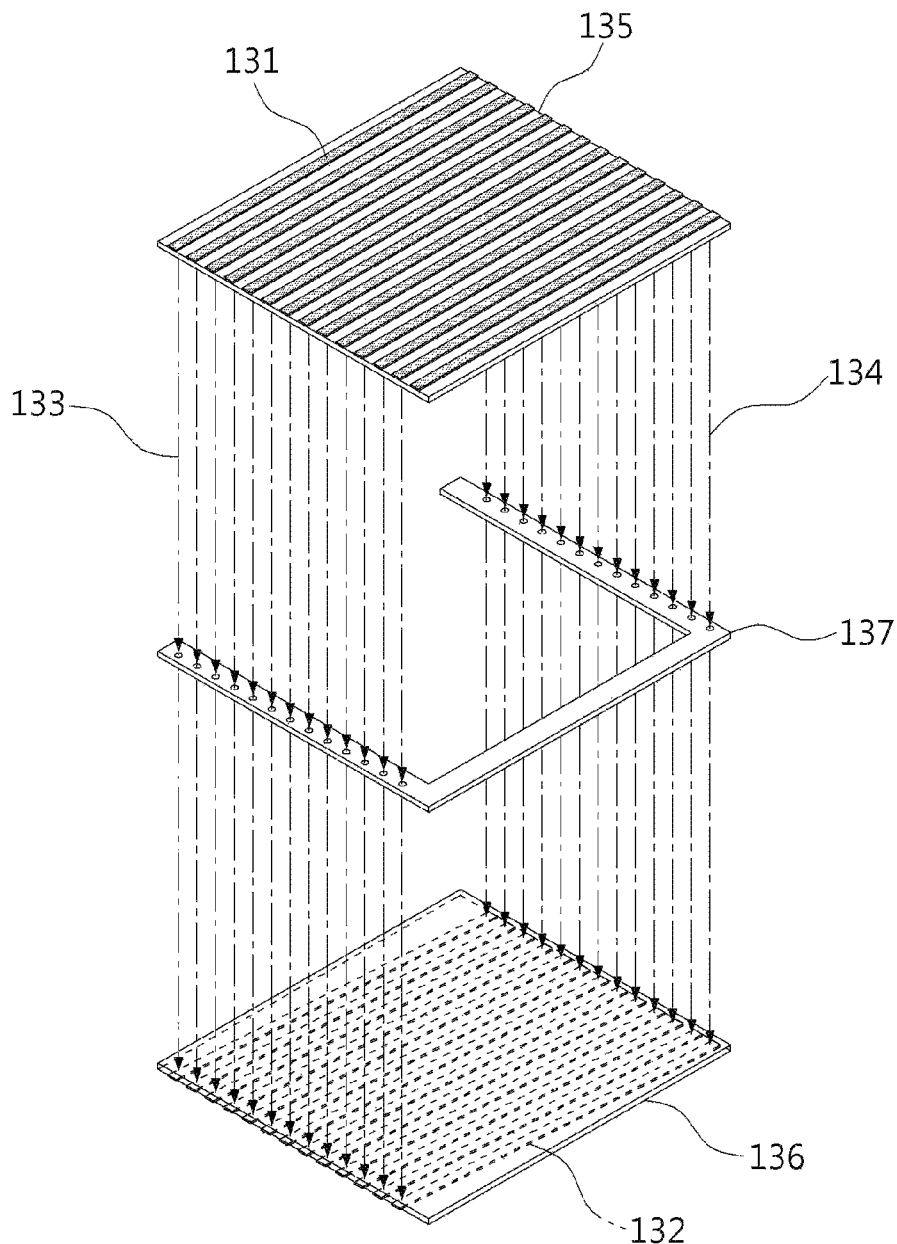
Figure 11:
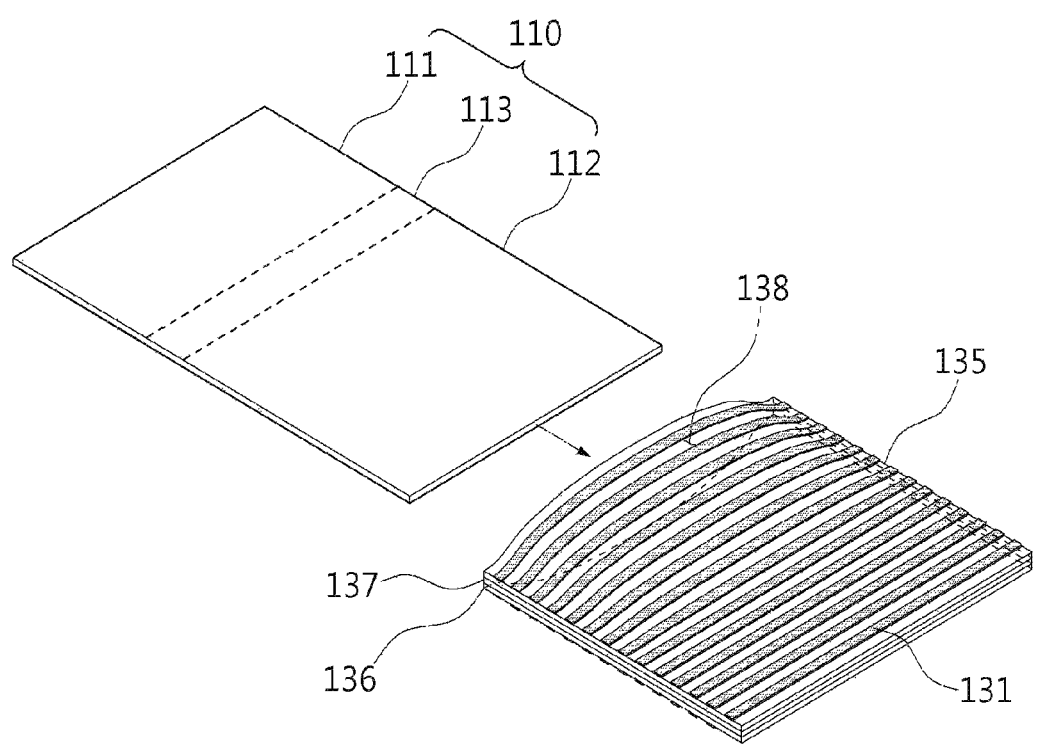

The second antenna 130 can be formed of a flexible printed circuit board. For example, referring to FIGS. 10 and 11, the second antenna 130 is configured to include a third circuit board 135 and a fourth circuit board 136.

The third circuit board 135 is formed to have the plurality of third radiation patterns 131 formed to be spaced apart from each other on the upper surface thereof. In this time, the plurality of third radiation patterns 131 are formed on the upper surface of the third circuit board 135 in the printing method.

The fourth circuit board 136 is formed to have the plurality of fourth radiation patterns 132 formed to be spaced apart from each other on the lower surface thereof. In this time, the plurality of fourth radiation patterns 132 are formed on the lower surface of the fourth circuit board 136 in the printing method. The fourth circuit board 136 has the upper surface adhered with the lower surface of the third circuit board 135.

In this time, although having described as an example that the third circuit board 135 and the fourth circuit board 136 are formed with the radiation pattern, it is not limited thereto and any method of forming the circuit pattern in the method of manufacturing the general printed circuit board can be used.

The stacked body in which the third circuit board 135 and the fourth circuit board 136 are stacked can be formed with a receiving space 138 for receiving the magnetic sheet 110.

The receiving space 138 can be interposed between the third circuit board 135 and the fourth circuit board 136, and can be formed in the pocket shape having at least one side opened.

For this purpose, the third circuit board 135 and the fourth circuit board 136 can have the edge sides bonded to each other through a second adhesion layer 137. In this time, the second adhesion layer 137 can be a bonding sheet or a thermosetting adhesive agent, but is not limited thereto and any material can be used as long as the edges of the two circuit boards can be bonded.

The second adhesion layer 137 cannot be located on the partial edge side of the entire edges. For example, when the third circuit board 135 and the fourth circuit board 136 have the rectangular shape, the second adhesion layer 137 can be located on three sides except for one of the four sides, or can be located on two sides facing each other.

In this time, as the second region 112 of the magnetic sheet 110 or the second magnetic sheet 116 is inserted into the receiving space, the plurality of third radiation patterns 131 are located on one surface of the magnetic sheet 110, and the plurality of fourth radiation patterns 132 are located on the other surface of the magnetic sheet 110.

The plurality of third radiation patterns 131 and the plurality of fourth radiation patterns 132 are connected through a plurality of via holes to constitute one radiation body, and the configured radiation body forms the vertical winding type radiation pattern winding the magnetic sheet 110 in the vertical direction thereof. Herein, since the plurality of via holes correspond to the third connection pattern 133 and the fourth connection pattern 134, they are denoted by the same reference numerals.

In the above description, although having described that the first antenna 120 and the second antenna 130 are formed as an independent flexible printed circuit board, respectively, they are not limited thereto and can be formed of one flexible printed circuit board.

Figure 12:
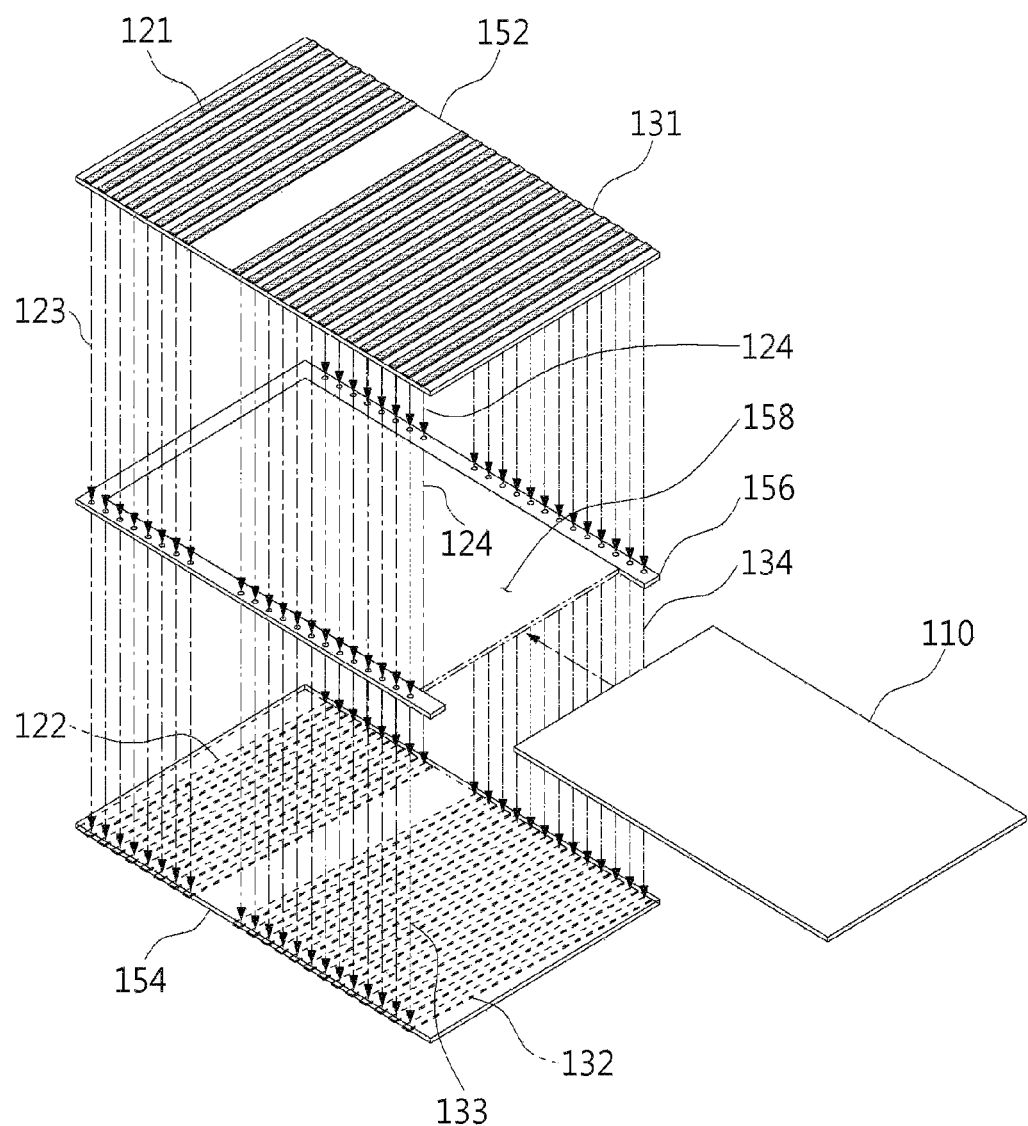
FIGS. 12 and 13 are diagrams for explaining variation examples of the first antenna and the second antenna of FIG. 1.

Referring to FIG. 12, the flexible printed circuit board includes an upper circuit board 152 and a lower circuit board 154.

The upper circuit board 152 has the plurality of first radiation patterns 121 and the plurality of third radiation patterns 131 formed on the upper surface thereof. In this time, the plurality of first radiation patterns 121 are formed to be biased toward one short side of the upper circuit board 152, and the plurality of second radiation patterns 122 are formed to be biased toward the other short side of the upper circuit board 152.

The lower circuit board 154 has the plurality of second radiation patterns 122 and the plurality of fourth radiation patterns 132 formed on the lower surface thereof. In this time, the plurality of second radiation patterns 122 are formed to be biased toward one short side of the lower circuit board 154, and the plurality of fourth radiation patterns 132 are formed to be biased toward the other short side of the lower circuit board 154.

The upper circuit board 152 and the lower circuit board 154 can have the edge sides bonded to each other through a third adhesion layer 156. In this time, the third adhesion layer 156 cannot be located on at least one edge side thereof.

Accordingly, the stacked body in which the upper circuit board 152 and the lower circuit board 154 are stacked can be formed with a receiving space 158 for receiving the magnetic sheet 110. The receiving space 158 can be interposed between the upper circuit board 152 and the lower circuit board 154, and can be formed in the pocket shape having at least one side opened.

Figure 13:
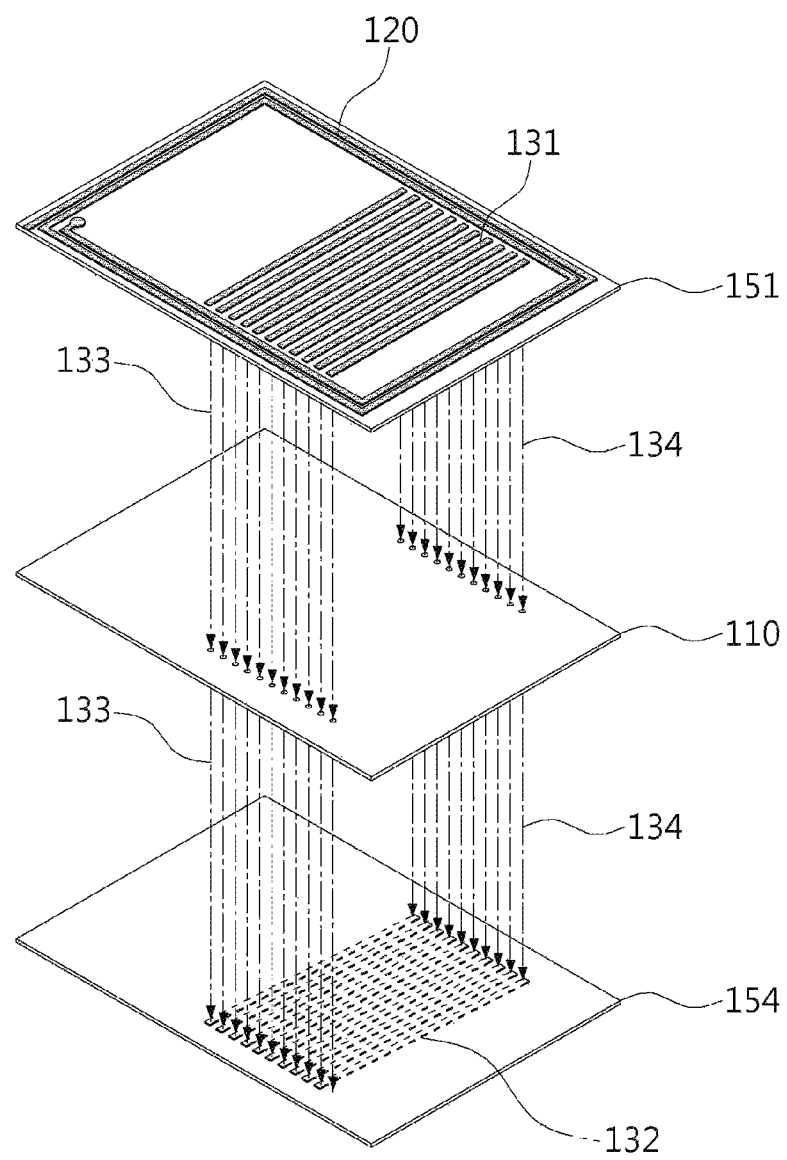

Meanwhile, referring to FIG. 13, the first antenna 120 can be formed in the horizontal winding type radiation pattern on the upper surface of the upper circuit board 152.

That is, the first antenna 120 requires an inductance of about 1 to 3 µH in order to implement performance of the NFC antenna.

Since the demand can be implemented even in the small area, the first antenna 120 is formed in the loop shape along the outer circumference of the upper surface of the upper circuit board 152 to form a horizontal winding type radiation pattern.

In this time, the third radiation patterns 131 of the second antenna 130 are located inside the inner circumference of the first antenna 120, and are formed to be spaced apart from the inner circumference of the first antenna 120 at a predetermined interval. The fourth radiation patterns 132 of the second antenna 130 are formed on the lower surface of the lower circuit board 154.

The magnetic sheet 110 is interposed between the upper circuit board 152 and the lower circuit board 154. In this time, the magnetic sheet 110 can be integrated or interposed while the first magnetic sheet 115 and the second magnetic sheet 116 are separated.

The second antenna 130 penetrates the magnetic sheet 110 to connect the third radiation pattern 131 and the fourth radiation pattern 132 through a via hole. Accordingly, it constitutes the vertical winding type radiation pattern wound in the vertical direction of the magnetic sheet 110.

Figure 14:
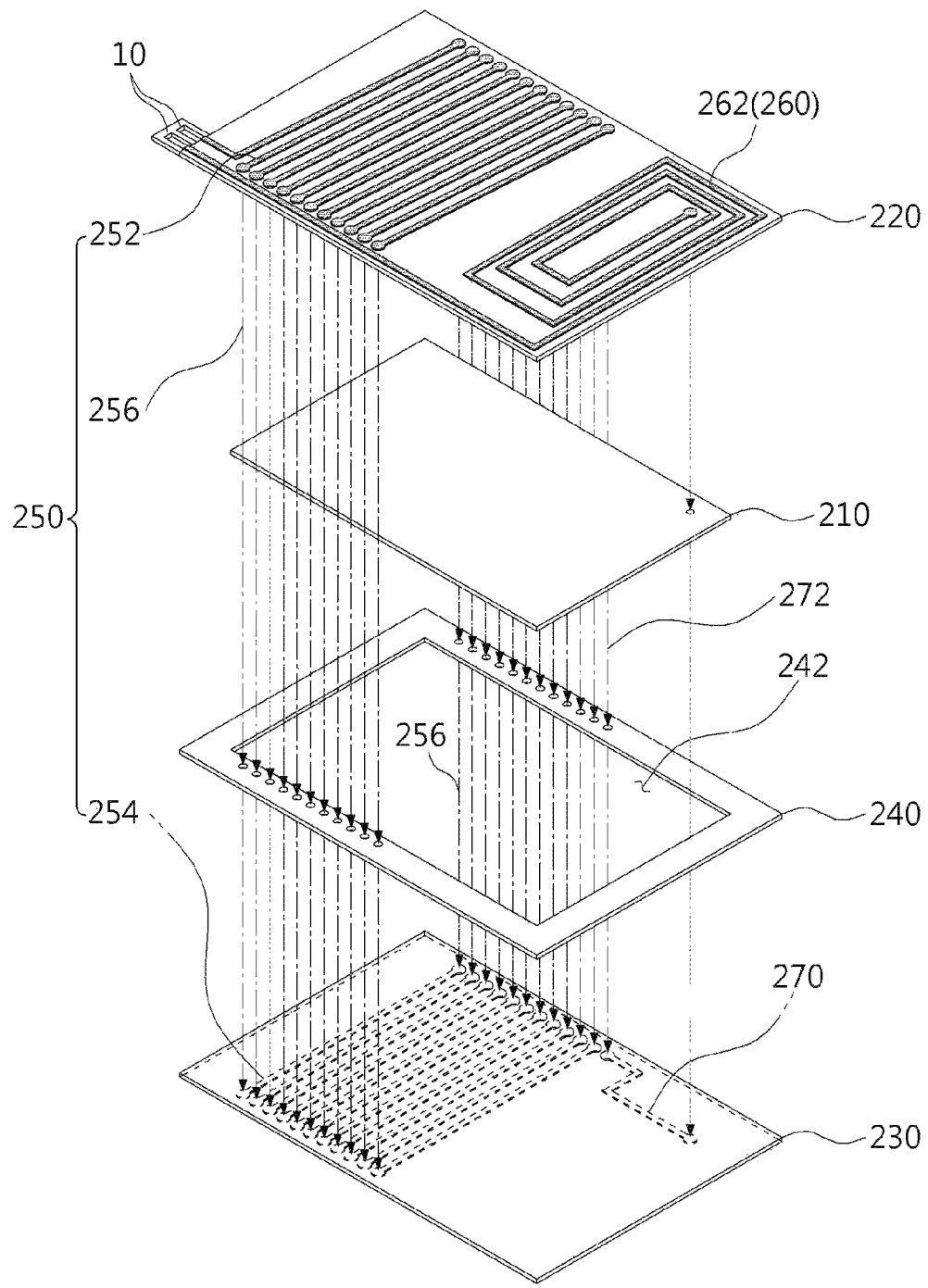
FIGS. 14 and 15 are diagrams for explaining an antenna module in accordance with a second embodiment of the present disclosure.

Referring to FIG. 14, an antenna module in accordance with a second embodiment of the present disclosure is configured to include a magnetic sheet 200, an upper circuit board 220, a lower circuit board 230, an adhesion sheet 240, a first antenna 250, a second antenna 260, and an antenna connection pattern 270.

The first antenna 250 and the second antenna 260 are connected through the antenna connection pattern 270 to constitute an antenna resonating in one frequency band, and operate as an antenna resonating in one frequency band selected from the first frequency band and the second frequency band.

Herein, for example, the first frequency band is a Near Field Communication (NFC) frequency band resonating at a frequency of about 13.56 MHz, and the second frequency band is a Magnetic Secure Transmission (MST) frequency band resonating at a frequency of about 10 kHz or less.

The magnetic sheet 200 can be formed of any one selected from an iron-based amorphous sheet, a nanocrystalline sheet, a ferrite sheet, a polymer sheet, and a metal sheet having a predetermined magnetic permeability and permittivity.

In this time, the magnetic sheet 200 can be formed with a plurality of via holes electrically connecting radiation patterns formed on the upper circuit board 220 and radiation patterns formed on the lower circuit board 230.

The upper circuit board 220 is located on the upper surface of the magnetic sheet 200. The upper circuit board 220 is formed of a flexible printed circuit board, and has a radiation pattern constituting the first antenna 250 and the second antenna 260 formed on the upper surface thereof.

The lower circuit board 230 is located on the lower surface of the magnetic sheet 200. The lower circuit board 230 is formed of a flexible printed circuit board, and has a radiation pattern constituting the first antenna 250 formed on the lower surface thereof.

The adhesion sheet 240 is interposed between the upper circuit board 220 and the lower circuit board 230 to adhere the lower surface of the upper circuit board 220 and the upper surface of the lower circuit board 230. In this time, the adhesion sheet 240 is formed along the outer circumferences of the upper circuit board 220 and the lower circuit board 230, and has a receiving space 242 in which the magnetic sheet 200 is received formed therein.

FIG. 14 illustrates that the adhesion sheet 240 is located only on the outer circumferences of the upper circuit board 220 and the lower circuit board 230, but it is not limited thereto and can be also formed on the upper and lower surfaces of the magnetic sheet 200 to adhere the magnetic sheet 200 and the upper circuit board 220, and the magnetic sheet 200 and the lower circuit board 230.

In addition, the adhesion sheet 240 can be formed with a plurality of via holes electrically connecting the radiation patterns formed on the upper circuit board 220 and the radiation patterns formed on the lower circuit board 230.

The first antenna 250 is alternately located on the upper circuit board 220 and the lower circuit board 230 to form the vertical winding type radiation pattern wound in the vertical direction of the magnetic sheet 200.

For example, the first antenna 250 can be configured to include a plurality of first upper radiation patterns 252, a plurality of lower radiation patterns 254, and a plurality of via radiation patterns 256.

The plurality of first upper radiation patterns 252 are located on the upper surface of the upper circuit board 220. The plurality of first upper radiation patterns 252 are formed to be biased toward one short side of the upper circuit board 220.

In this time, the plurality of first upper radiation patterns 252 are located to be spaced apart from each other at a predetermined interval. In this time, each of the first upper radiation patterns 252 is located parallel with other first upper radiation patterns 252.

The plurality of lower radiation patterns 254 are located on the lower surface of the lower circuit board 230. The plurality of lower radiation patterns 254 are formed to be biased toward one short side of the lower circuit board 230.

In this time, the plurality of lower radiation patterns 254 are located to be spaced apart from each other at a predetermined interval. In this time, each of the lower radiation patterns 254 is located parallel with other lower radiation patterns 254.

The plurality of via radiation patterns 256 penetrate the upper circuit board 220 and the lower circuit board 230 to connect the first upper radiation pattern 252 and the lower radiation pattern 254. Herein, the plurality of via radiation patterns 256 can be formed by penetrating one selected from the magnetic sheet 200 and the adhesion sheet 240.

For example, some of the plurality of via radiation patterns 256 are formed to be biased toward one long sides and one short sides of the upper circuit board 220 and the lower circuit board 230 to connect one end of the first upper radiation pattern 252 and one end of the lower radiation pattern 254.

The others of the plurality of via radiation patterns 256 are formed to be biased toward the other long sides and one short sides of the upper circuit board 220 and the lower circuit board 230 to connect the other end of the first upper radiation pattern 252 and the other end of the lower radiation pattern 254.

Accordingly, the first antenna 250 is formed in the vertical winding type radiation pattern wound in the vertical direction of the magnetic sheet 200.

The second antenna 260 is formed on the upper surface of the upper circuit board 220 to form the horizontal winding type radiation pattern wound on the magnetic sheet 200 in the horizontal direction thereof. In this time, the second antenna 260 is formed to be spaced apart from the first antenna 250 to be biased toward the other short side of the upper circuit board 220.

For example, the second antenna 260 includes a second upper radiation pattern 262 formed in the loop shape on the upper surface of the upper circuit board 220. In this time, the second upper radiation pattern 262 is wound to have a predetermined number of turns to be formed on the upper surface of the upper circuit board 220, and is located to be biased toward the other short side of the upper circuit board 220.

The antenna connection pattern 270 connects the first antenna 250 and the second antenna 260. That is, one end of the antenna connection pattern 270 is connected with one end of the first antenna 250, and the other end thereof is connected with one end of the second antenna 260. In this time, the other end of the first antenna 250 and the other end of the second antenna 260 are connected to the terminal 20, respectively.

For example, the antenna connection pattern 270 is formed on the lower surface of the lower circuit board 230, and connects the first antenna 250 and the second antenna 260 through a via hole 272.

One end of the antenna connection pattern 270 is connected with the first upper radiation pattern 252 formed on the upper circuit board 220 through the via hole 272 penetrating the lower circuit board 230 and the upper circuit board 220. In this time, one end of the antenna connection pattern 270 is connected to one end of the first upper radiation pattern 252 located adjacent to the second upper radiation pattern 262 among the plurality of first upper radiation patterns 252.

The other end of the antenna connection pattern 270 is connected with one end of the second upper radiation pattern 262 formed on the upper circuit board 220 through the via hole 272 penetrating the lower circuit board 230 and the upper circuit board 220.

Accordingly, the first antenna 250 and the second antenna 260 are connected to each other to operate as an antenna resonating in one frequency band selected from the first frequency band and the second frequency band.

Herein, FIG. 14 illustrates that the antenna connection pattern 270 is formed on the lower circuit board 230, but it is not limited thereto and can be also formed on the upper circuit board 220.

Figure 15:
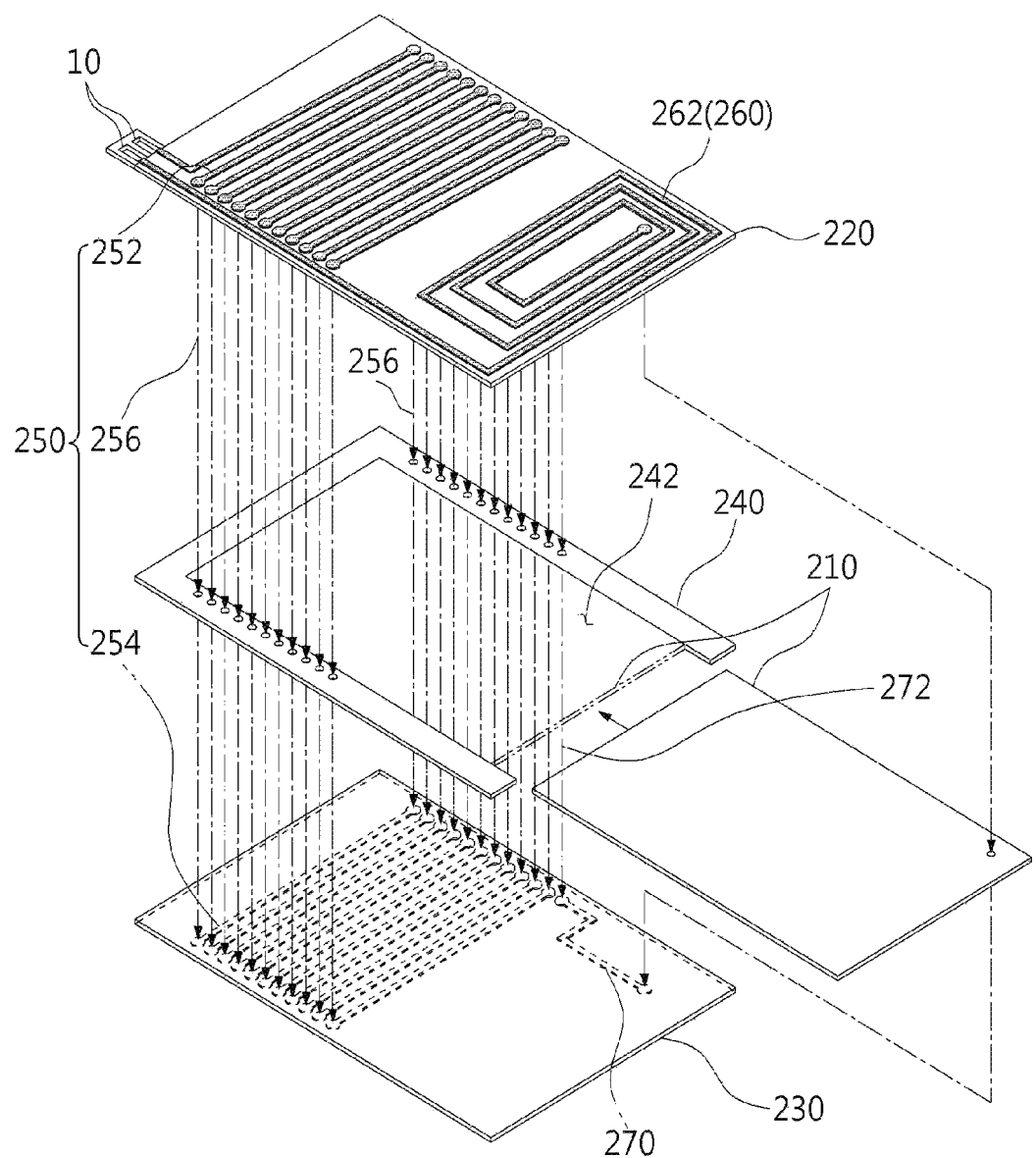

Referring to FIG. 15, the adhesion sheet 240 cannot be located on the partial edge side of the entire edges in order to obtain the receiving space 242 into which the magnetic sheet 200 is inserted.

For example, when the upper circuit board 220 and the lower circuit board 230 have the rectangular shape, the adhesion sheet 240 is located on three sides except for one of the four sides. In this time, the adhesion sheet 240 can be located on two sides facing each other of the four sides.

Accordingly, the adhesion sheet 240 can form the pocket-shaped receiving space 242 having at least one edge side opened.

The magnetic sheet 200 is inserted through the edge side where the adhesion sheet 240 is not located to be received in the receiving space 242.

Accordingly, the first upper radiation pattern 252 and the second upper radiation pattern 262 are located on the upper portion of the magnetic sheet 200, and the lower radiation pattern 254 is located on the lower portion of the magnetic sheet 200.

Figure 16:
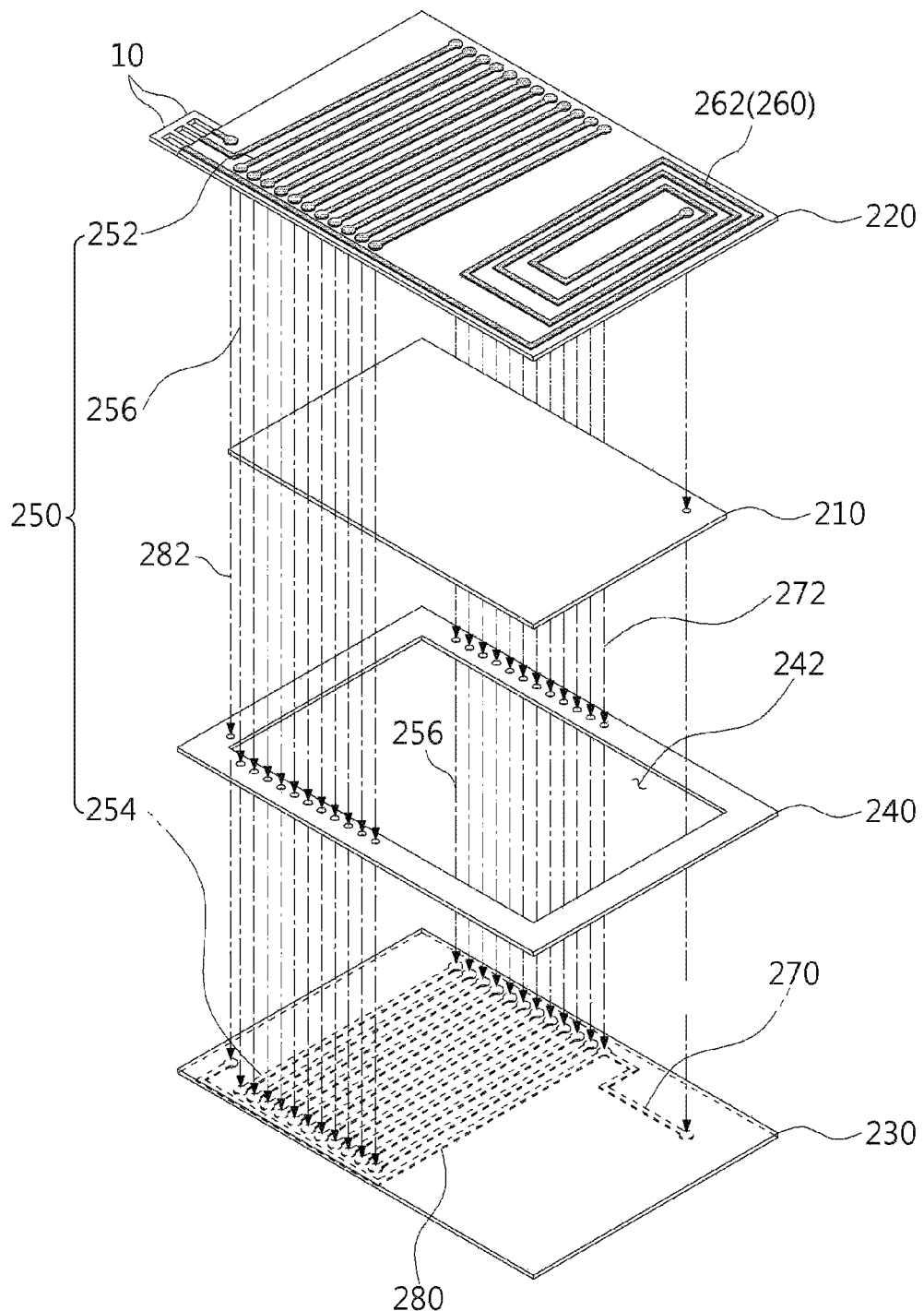
FIG. 16 is a diagram for explaining a variation example of the antenna module in accordance with the second embodiment of the present disclosure.

Referring to FIG. 16, the antenna module can further include a branch pattern 280 connected to one end of the first antenna 250.

The branch pattern 280 is formed on the lower circuit board 230. In this time, the branch pattern 280 can be formed on the lower surface of the lower circuit board 230.

The branch pattern 280 has one end connected with one end of the first upper radiation pattern 252, and has the other end connected to the terminal. In this time, the other end of the branch pattern 280 is connected to the terminal different from the terminals having the other ends of the first antenna 250 and the second antenna 260 connected. Herein, the branch pattern 280 can be connected to the first upper radiation pattern 252 and the terminal through a via hole 282.

Accordingly, the first antenna 250 operates as an antenna resonating in one frequency band selected from the first frequency band and the second frequency band, and the first antenna 250 and the second antenna 260 operate as antennas resonating in the other one frequency band.

For example, when the first frequency band and the second frequency band are the NFC frequency band and the MST frequency band, respectively, the first antenna 250 operates as an antenna resonating in the NFC frequency band that is a relatively high frequency, and the first antenna 250 and the second antenna 260 operate as antennas resonating in the MST frequency band that is a relatively high frequency.

Through a switching control of an internal circuit of the portable terminal, the antenna module can control so that the first antenna 250 and the second antenna 260 resonate in different frequency bands, or control so that the first antenna 250 and the second antenna 260 resonate in one frequency band.

Figure 17:
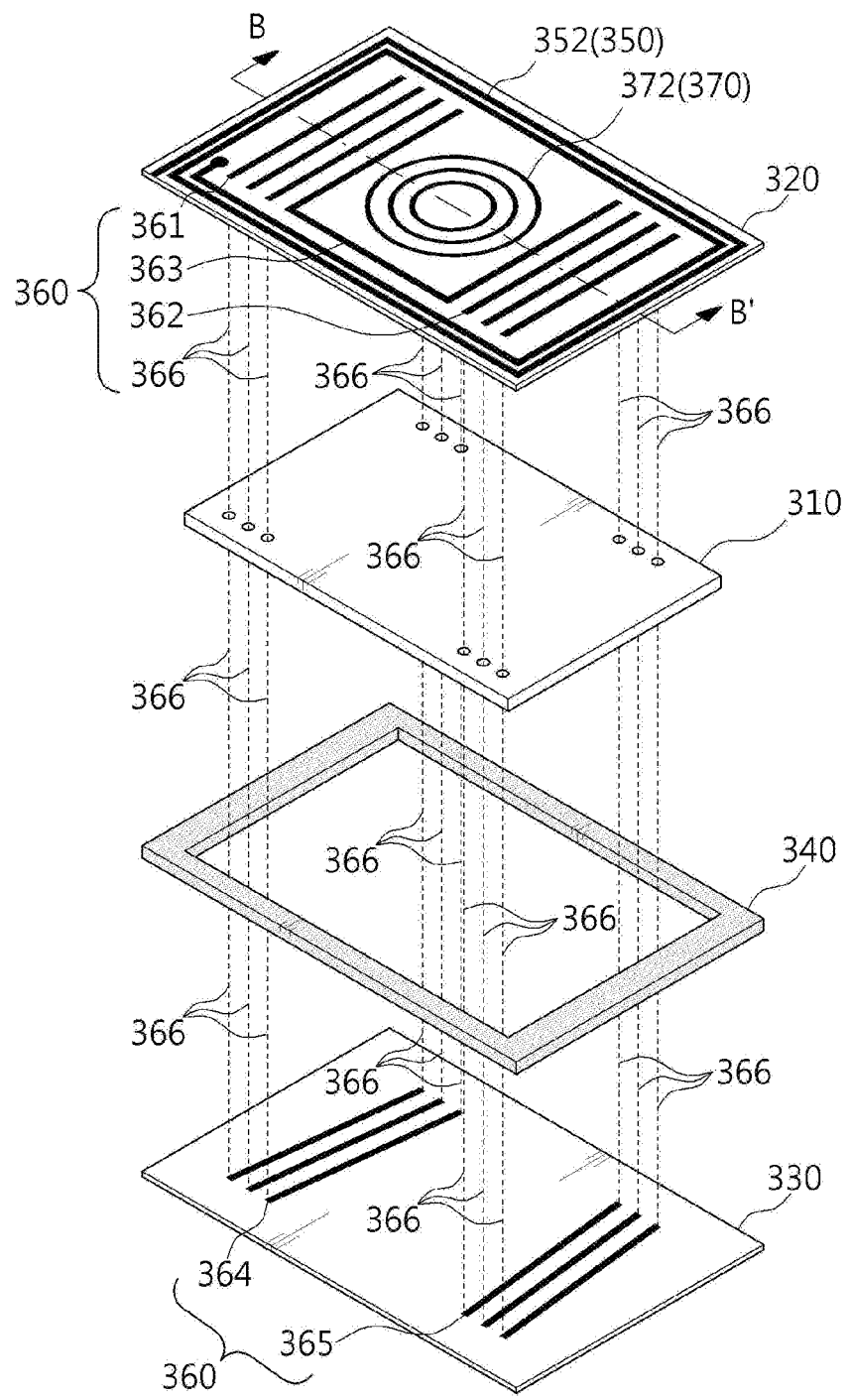
FIG. 17 is a diagram for explaining an antenna module in accordance with a third embodiment of the present disclosure.
Figure 18:
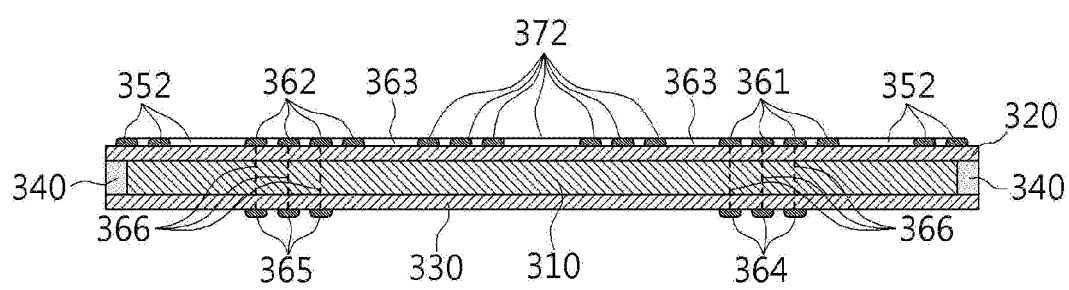
FIG. 18 is a diagram illustrating a cutting surface of the antenna module taken along line B-B'.

Referring to FIGS. 17 and 18, an antenna module in accordance with a third embodiment of the present disclosure is configured to include a magnetic sheet 310, an upper circuit board 320, a lower circuit board 330, an adhesion sheet 340, a first antenna 350, a second antenna 360, and a third antenna 370.

The magnetic sheet 310 can be formed of any one selected from an iron-based amorphous sheet, a nanocrystalline sheet, a ferrite sheet, a polymer sheet, and a metal sheet.

In this time, the magnetic sheet 310 can be formed with a plurality of via holes (i.e., via radiation patterns 366) electrically connecting the upper radiation pattern and the lower radiation pattern constituting the second antenna 360.

The upper circuit board 320 is located on the upper surface of the magnetic sheet 310. The upper circuit board 320 is formed of a flexible printed circuit board, and has a plurality of radiation patterns constituting the first antenna 350, the second antenna 360, and the third antenna 370 formed on the upper surface thereof.

The lower circuit board 330 is located on the lower surface of the magnetic sheet 310. The lower circuit board 330 is formed of a flexible printed circuit board, and has a plurality of radiation patterns constituting the second antenna 360 formed on the lower surface thereof.

The adhesion sheet 340 is interposed between the upper circuit board 320 and the lower circuit board 330 to adhere the upper circuit board 320 and the lower circuit board 330. In this time, the adhesion sheet 340 is formed along the outer circumferences of the upper circuit board 320 and the lower circuit board 330, and has a receiving space in which the magnetic sheet 310 is received formed therein.

FIG. 17 illustrates that the adhesion sheet 340 is located only on the outer circumferences of the upper circuit board 320 and the lower circuit board 330, but it is not limited thereto and can be also formed on the upper and lower surfaces of the magnetic sheet 310 to adhere the magnetic sheet 310 and the upper circuit board 320, and the magnetic sheet 310 and the lower circuit board 330.

In addition, the adhesion sheet 340 can be formed with a plurality of via holes (i.e., via radiation patterns 366) electrically connecting the upper radiation pattern and the lower radiation pattern.

The first antenna 350 resonates in the first frequency band. Herein, for example, the first frequency band is a Near Field Communication (NFC) frequency band.

The first antenna 350 is formed on the upper surface of the upper circuit board 320 to form the horizontal winding type radiation pattern wound on the magnetic sheet 310 in the horizontal direction thereof. For example, the first antenna 350 includes a first upper radiation pattern 352 formed in the loop shape on the upper surface of the upper circuit board 320. In this time, the first upper radiation pattern 352 is wound to have a predetermined number of turns along the outer circumference of the upper surface of the upper circuit board 320.

The second antenna 360 resonates in the second frequency band. Herein, for example, the second frequency band is a Magnetic Secure Transmission (MST) frequency band.

The second antenna 360 is alternately located on the upper circuit board 320 and the lower circuit board 330 to form the vertical winding type radiation pattern wound in the vertical direction of the magnetic sheet 310.

For example, the second antenna 360 can be configured to include a plurality of second upper radiation patterns 361, a plurality of third upper radiation patterns 362, a connection radiation pattern 363, a plurality of first lower radiation patterns 364, a plurality of second lower radiation patterns 365, and a plurality of via radiation patterns 366.

The plurality of second upper radiation patterns 361 are located on the upper surface of the upper circuit board 320, and are formed to be biased toward one short side of the upper circuit board 320. In this time, the plurality of second upper radiation patterns 361 are located inside the inner circumference of the first upper radiation pattern 352.

The plurality of second upper radiation patterns 361 are located to be spaced apart from each other at a predetermined interval. In this time, each second upper radiation pattern 361 is located parallel with other second upper radiation patterns 361.

The plurality of third upper radiation patterns 362 are located on the upper surface of the upper circuit board 320, and are formed to be biased toward the other short side of the upper circuit board 320. In this time, the plurality of third upper radiation patterns 362 are located inside the inner circumference of the first upper radiation pattern 352.

The plurality of third upper radiation patterns 362 are located to be spaced apart from each other at a predetermined interval. In this time, each third upper radiation pattern 362 is located parallel with other third upper radiation patterns 362.

The connection radiation pattern 363 is located on the upper surface of the upper circuit board 320, and is formed to be biased toward one long side of the upper circuit board 320. The connection radiation pattern 363 is connected with the second upper radiation pattern 361 and the third upper radiation pattern 362.

In this time, one end of the connection radiation pattern 363 is connected to one end of the second upper radiation pattern 361 closest to the third upper radiation pattern 362 of the plurality of second upper radiation patterns 361. The other end of the connection radiation pattern 363 is connected to one end of the third upper radiation pattern 362 closest to the second upper radiation pattern 361 of the plurality of third upper radiation patterns 362.

The plurality of first lower radiation patterns 364 are located on the lower surface of the lower circuit board 330, and are formed to be biased toward one short side of the lower circuit board 330. Herein, the plurality of first lower radiation patterns 364 are located on the lower portion of the second upper radiation pattern 361 with the magnetic sheet 310 interposed therebetween.

The plurality of first lower radiation patterns 364 are located to be spaced apart from each other at a predetermined interval. In this time, each first lower radiation pattern 364 is located parallel with other first lower radiation patterns 364.

The plurality of second lower radiation patterns 365 are located on the lower surface of the lower circuit board 330, and are formed to be biased toward the other short side of the lower circuit board 330. Herein, the plurality of second lower radiation patterns 365 are located on the lower portion of the third upper radiation pattern 362 with the magnetic sheet 310 interposed therebetween.

The plurality of second lower radiation patterns 365 are located to be spaced apart from each other at a predetermined interval. In this time, each second lower radiation pattern 365 is located parallel with other second lower radiation patterns 365.

The plurality of via radiation patterns 366 penetrate the upper circuit board 320 and the lower circuit board 330 to connect the radiation patterns formed on the upper circuit board 320 and the radiation patterns formed on the lower circuit board 330. Herein, the plurality of via radiation patterns 366 can also penetrate the magnetic sheet 310 or the adhesion sheet 340.

For example, some of the plurality of via radiation patterns 366 are located to be biased toward one long sides and one short sides of the upper circuit board 320 and the lower circuit board 330 to connect one end of the second upper radiation pattern 361 and one end of the first lower radiation pattern 364.

Others of the plurality of via radiation patterns 366 are located to be biased toward the other long sides and one short sides of the upper circuit board 320 and the lower circuit board 330 to connect the other end of the second upper radiation pattern 361 and the other end of the first lower radiation pattern 364.

Others of the plurality of via radiation patterns 366 are located to be biased to one long sides and the other short sides of the upper circuit board 320 and the lower circuit board 330 to connect one end of the third upper radiation pattern 362 and one end of the second lower radiation pattern 365.

The others of the plurality of via radiation patterns 366 are located to be biased to the other long sides and the other short sides of the upper circuit board 320 and the lower circuit board 330 to connect the other end of the third upper radiation pattern 362 and the other end of the second lower radiation pattern 365.

Accordingly, the second antenna 360 is formed in the vertical winding type radiation pattern wound in the vertical direction of the magnetic sheet 310.

The third antenna 370 is an antenna for wireless power transmission. In this time, for example, the third antenna 370 is a Wireless Power Consortium (WPC) antenna that transmits power in the magnetic induction scheme.

The third antenna 370 is formed on the upper surface of the upper circuit board 320 to form the horizontal winding type radiation pattern wound in the horizontal direction on the magnetic sheet 310.

For example, the third antenna 370 includes a fourth upper radiation pattern 372 formed in the loop shape on the upper surface of the upper circuit board 320. The fourth upper radiation pattern 372 is located inside the inner circumference of the first upper radiation pattern 352. In this time, the fourth upper radiation pattern 372 is interposed between the plurality of second upper radiation patterns 361 and the plurality of third upper radiation patterns 362. That is, the fourth upper radiation pattern 372 is formed in the region where the second upper radiation pattern 361 and the third upper radiation pattern 362 are spaced apart from each other.

Figure 19:
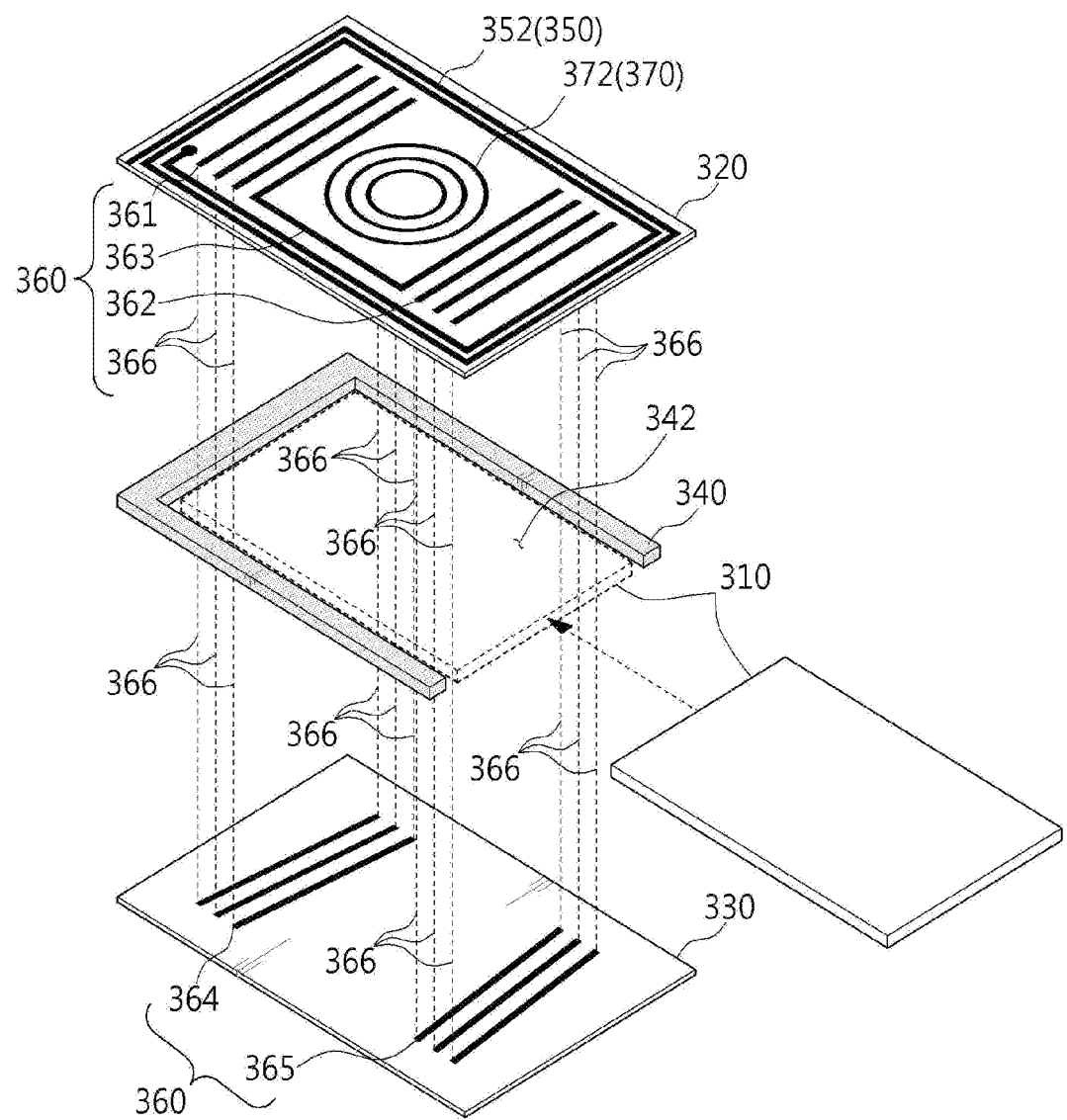
FIGS. 19 to 27 are diagrams illustrating variation examples of the antenna module in accordance with the third embodiment of the present disclosure.

Referring to FIG. 19, the antenna module is formed with a receiving space 342 in which the magnetic sheet 310 is received. That is, as the upper circuit board 320 and the lower circuit board 330 are coupled to each other through the adhesion sheet 340, the antenna module is formed with the receiving space 342 between the upper circuit board 320 and the lower circuit board 330. In this time, the receiving space 342 can be formed in the pocket shape having at least one side opened.

The adhesion sheet 340 cannot be located on the partial edge side of the entire edges in order to obtain a space into which the magnetic sheet 310 is inserted. For example, when the upper circuit board 320 and the lower circuit board 330 have the rectangular shape, the adhesion sheet can be located on three sides except for one of the four sides, or can be located on two sides facing each other of the four sides.

The magnetic sheet 310 is inserted through one side where the adhesion sheet 340 is not located to be received in the receiving space 342. Accordingly, the first upper radiation pattern 352, the second upper radiation pattern 361, the third upper radiation pattern 362, the fourth upper radiation pattern 372, and the connection radiation pattern 363 are formed on the upper portion of the magnetic sheet 310. The first lower radiation pattern 364 and the second lower radiation pattern 365 are located on the lower portion of the magnetic sheet 310.

Figure 20:
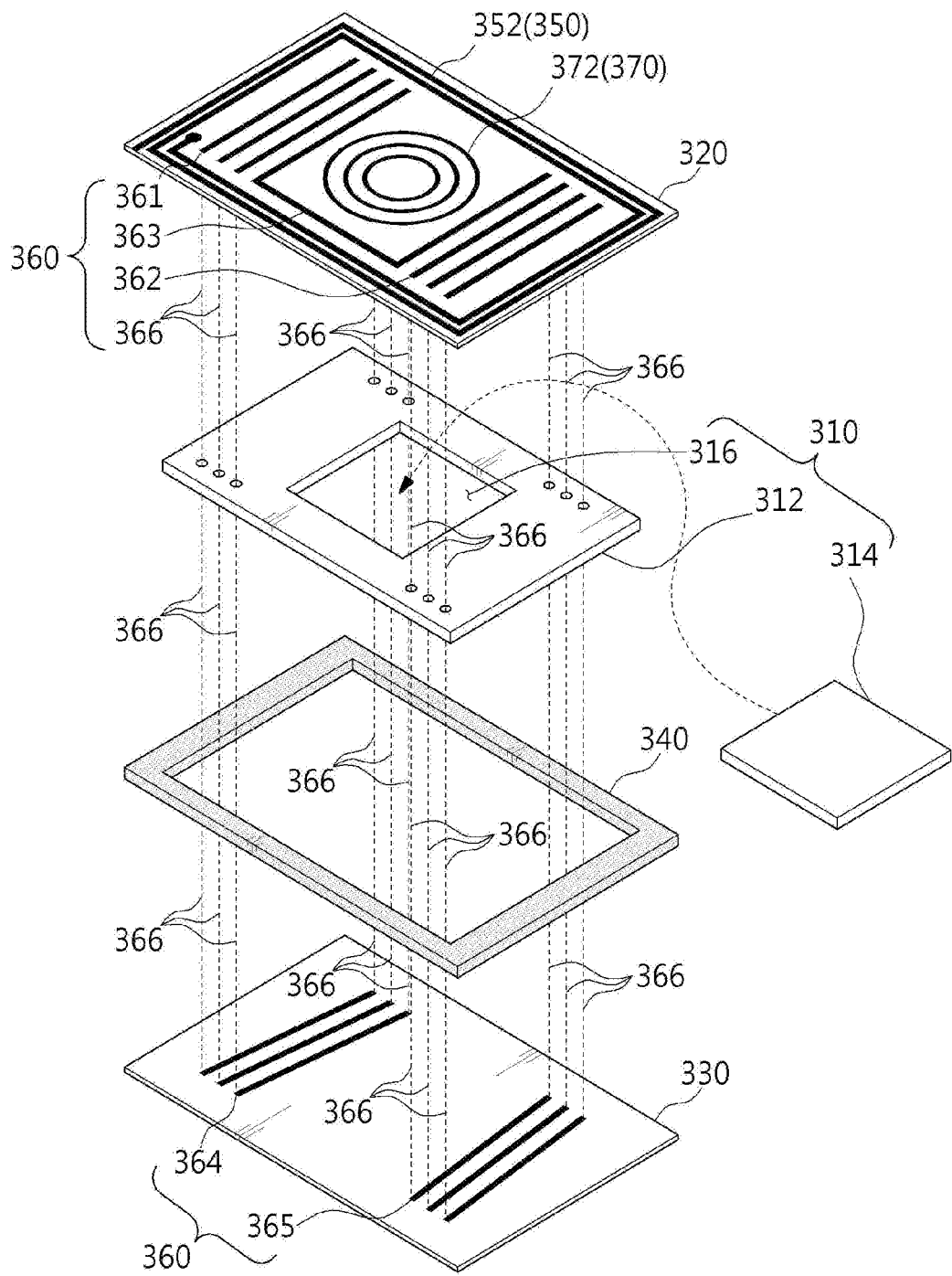
Figure 21:
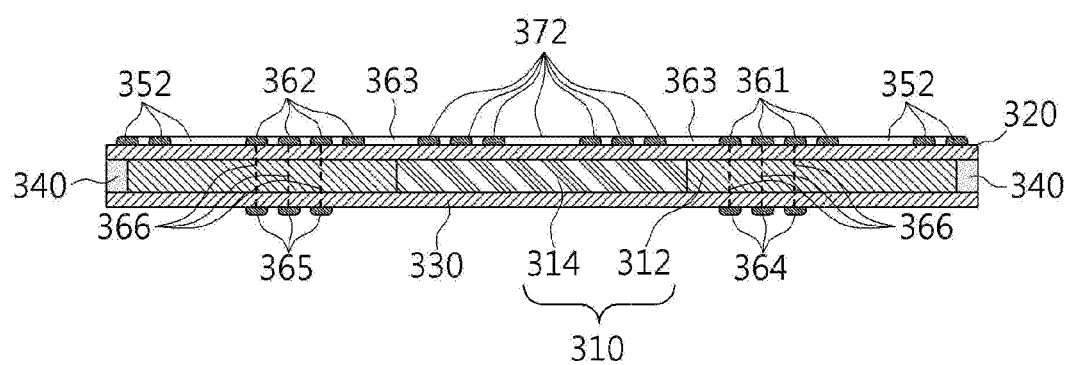

Referring to FIGS. 20 and 21, the magnetic sheet 310 can be formed so that the region located on the lower portion of the third antenna 370 has a magnetic material different from other regions.

For this purpose, the magnetic sheet 310 can be composed of a first magnetic sheet 312 located on the lower portions of the first antenna 350 and the second antenna 360, and a second magnetic sheet 314 located on the lower portion of the third antenna 370.

The first magnetic sheet 312 is formed of a magnetic material having a predetermined magnetic permeability. The first magnetic sheet 312 has a groove 316, into which the second magnetic sheet 314 is inserted, formed in the region located on the lower portion of the third antenna 370.

The second magnetic sheet 314 is inserted into the groove 316 formed on the first magnetic sheet 312 to be located on the lower surface of the upper circuit board 320, and located on the lower portion of the region where the third antenna 370 is located. In this time, the second magnetic sheet 314 is formed of the area that is the same as or narrower than the groove 316 formed on the first magnetic sheet 312.

The second magnetic sheet 314 is formed of a magnetic material having a higher magnetic permeability than the magnetic permeability of the first magnetic sheet 312. That is, in the wireless power transmission antenna, the higher the magnetic permeability of the magnetic sheet 310, the more the wireless power transmission efficiency and transmission distance increase.

Accordingly, the first magnetic sheet 312 is located on the first antenna 350 and the second antenna 360, and the second magnetic sheet 314 is located on the third antenna 370.

Figure 22:
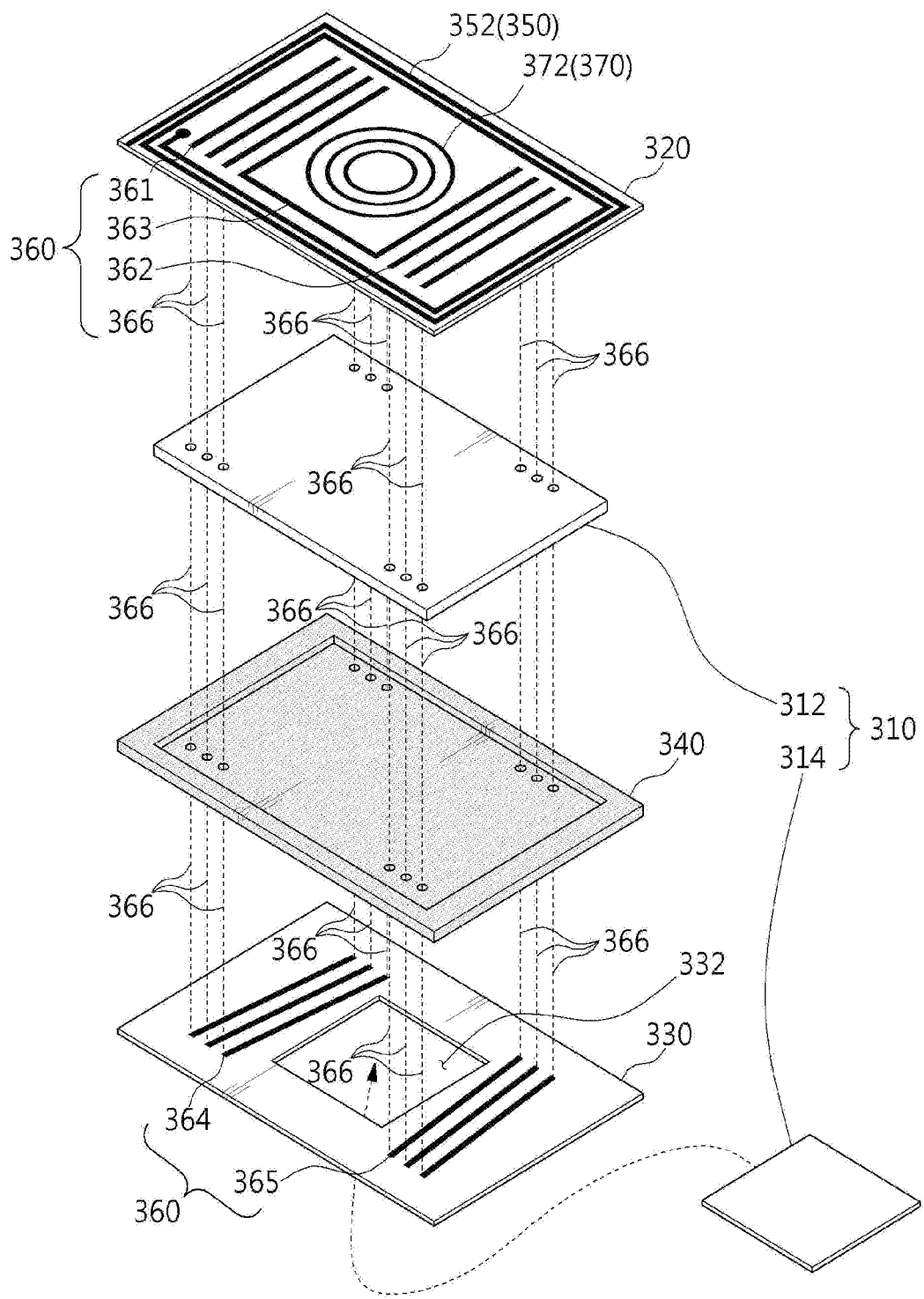
Figure 23:
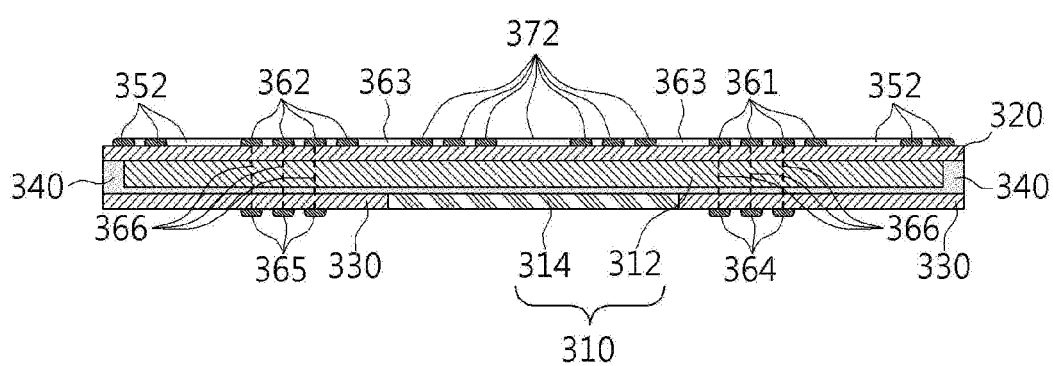

Referring to FIGS. 22 and 23, the magnetic sheet 310 can be formed so that the thickness of the region located on the lower portion of the third antenna 370 is thicker than those of other regions.

For example, the magnetic sheet 310 is composed of the first magnetic sheet 312 located on the lower surface of the upper circuit board 320 and the second magnetic sheet 314 located on the lower surface of the first magnetic sheet 312.

The first magnetic sheet 312 is located on the lower portion of the upper circuit board 320. In this time, the first magnetic sheet 312 is located to cover all the regions where the first antenna 350, the second antenna 360, and the third antenna 370 are formed. Herein, the first magnetic sheet 312 can be also located to cover only a part of the first antenna 350.

The second magnetic sheet 314 is located on the lower surface of the first magnetic sheet 312, and is located to cover the region located on the lower portion of the third antenna 370. In this time, the lower circuit board 330 has a groove 332 formed on the region located on the lower portion of the third antenna 370. The second magnetic sheet 314 is inserted into the groove 332 of the lower circuit board 330 to be located on the lower portion of the first magnetic sheet 312.

Accordingly, the thickness of the magnetic sheet 310 located on the lower region of the third antenna 370 is thicker than the thickness of the magnetic sheet 310 located on other regions. That is, the magnetic sheet 310 having the thickness that adds the thicknesses of the first magnetic sheet 312 and the second magnetic sheet 314 is located on the lower region of the third antenna 370, and the magnetic sheet 310 is located at the thickness of the first magnetic sheet 312 in other regions.

In this time, as the thickness of the magnetic sheet 310 increases, the third antenna 370 has a greater magnetic field path to thereby strengthen the magnetic field. The third antenna 370 operates as a wireless power transmission antenna, such that when the magnetic field is strengthened, the magnetic permeability saturation point increases to thereby increase the magnetic permeability. As the magnetic permeability increases, the wireless power transmission efficiency and transmission distance of the third antenna 370 increases.

Figure 24:
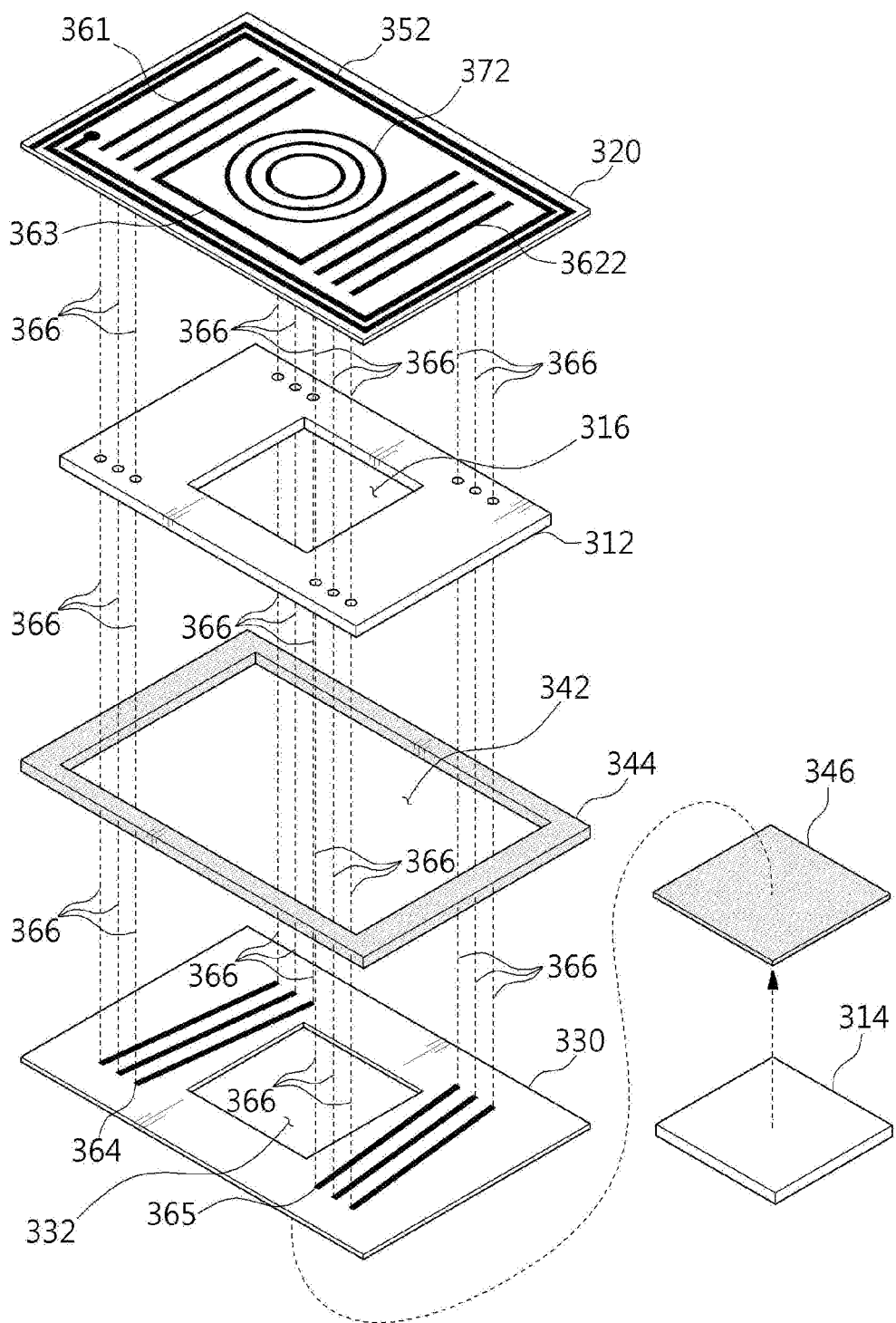
Figure 25:
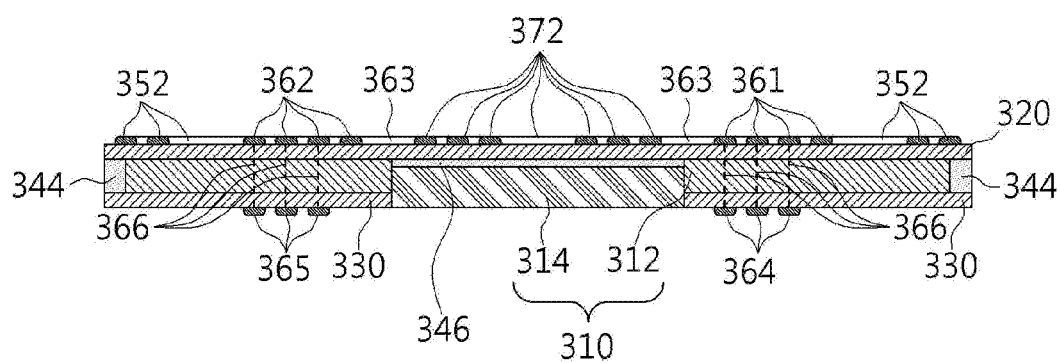

Referring to FIGS. 24 and 25, the magnetic sheet 310 can be formed to have different thicknesses and materials in the region located on the lower portion of the third antenna 370 and other regions.

For this purpose, the magnetic sheet 310 can be composed of the first magnetic sheet 312 and the second magnetic sheet 314.

The first magnetic sheet 312 is located on the lower surface of the upper circuit board 320. In this time, the first magnetic sheet 312 is formed with the groove 316 in which the second magnetic sheet 314 is received. In this time, the groove 316 is formed on the region located on the lower surface of the third antenna 370.

The lower circuit board 330 is formed with the groove 332 in which the second magnetic sheet 314 is received. In this time, the groove 332 is formed on the region located on the lower surface of the third antenna 370, and is interposed between the first lower radiation pattern 364 and the second lower radiation pattern 365.

The second magnetic sheet 314 is received in the grooves 332, 316 to be located on the lower surface of the upper circuit board 320. In this time, the second magnetic sheet 314 is located on the lower surface of the upper circuit board 320, and is located on the lower surface of the region where the third antenna 370 is located.

The second magnetic sheet 314 is formed to have the thickness adding the thicknesses of the first magnetic sheet 312 and the lower circuit board 330, and is formed to be thicker than the first magnetic sheet 312. Herein, the second magnetic sheet 314 is formed of a material having a higher magnetic permeability than the first magnetic sheet 312 in order to enhance the wireless power transmission performance (i.e., the wireless power transmission efficiency and the transmission distance) of the third antenna 370.

Meanwhile, the adhesion sheet 340 can be composed of the first adhesion sheet 344 interposed between the upper circuit board 320 and the lower circuit board 330, and the second adhesion sheet 346 interposed between the upper circuit board 320 and the second magnetic sheet 314.

The first adhesion sheet 344 is located along the edges of the upper circuit board 320 and the lower circuit board 330 to form the receiving space 342 in which the first magnetic sheet 312 is received.

The second adhesion sheet 346 is inserted into the groove 316 of the first magnetic sheet 312 and the groove 332 of the lower circuit board 330. The second adhesion sheet 346 is interposed between the upper circuit board 320 and the second magnetic sheet 314 to adhere the lower surface of the upper circuit board 320 and the upper surface of the second magnetic sheet 314.

As described above, it is possible for the antenna module to locate the magnetic sheet 310 having a thicker thickness and a higher magnetic permeability than other regions on the lower portion of the third antenna 370, thus increasing the wireless power transmission efficiency and the transmission distance.

Figure 26:
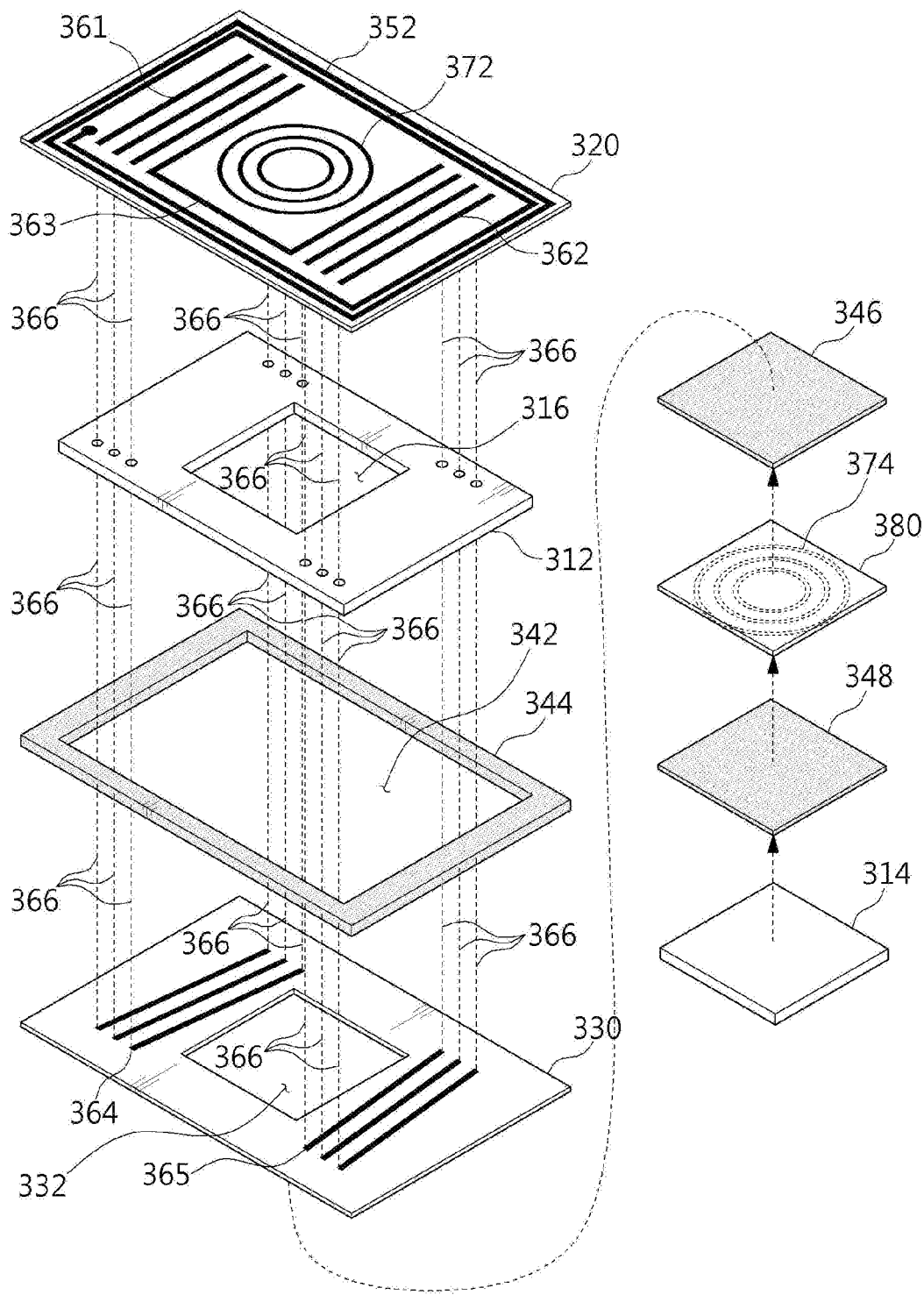
Figure 27:
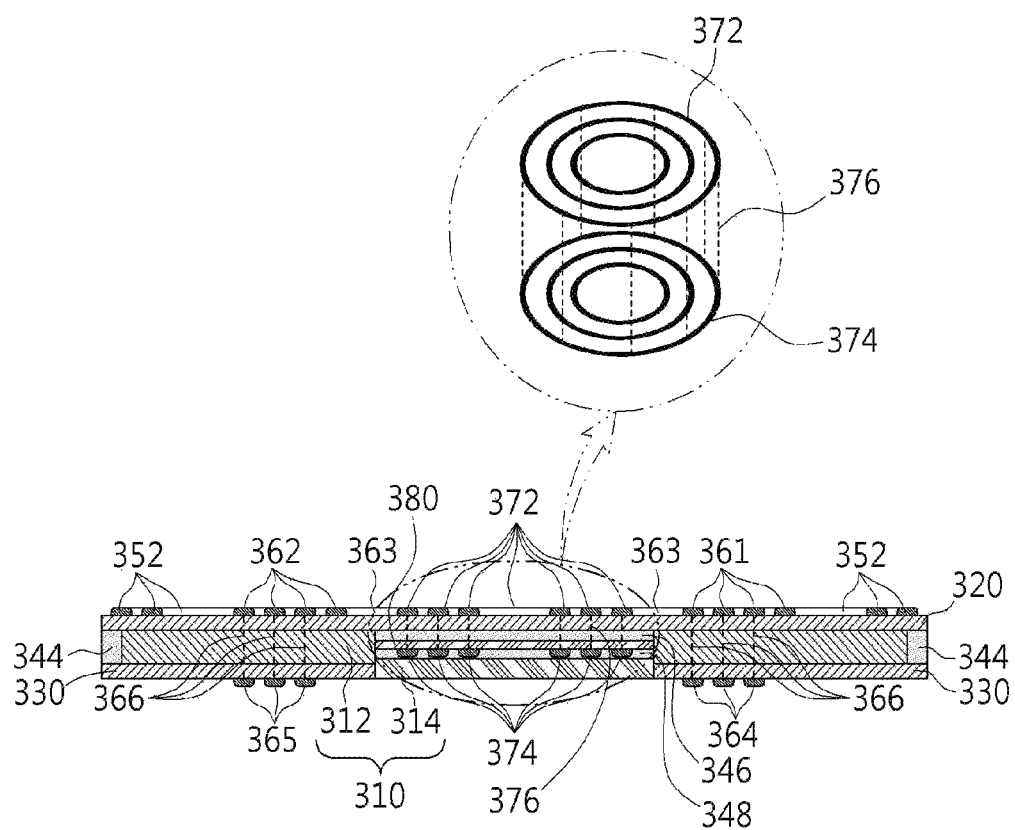

Referring to FIGS. 26 and 27, the antenna module can further include an insertion circuit board 380 interposed between the upper circuit board 320 and the second magnetic sheet 314.

The insertion circuit board 380 is interposed between the lower surface of the upper circuit board 320 and the upper surface of the second magnetic sheet 314. In this time, the insertion circuit board 380 can be adhered to the lower surface of the upper circuit board 320 by the second adhesion sheet 346 located on the lower surface of the upper circuit board 320.

The insertion circuit board 380 has a third lower radiation pattern 374 formed on the lower surface thereof. The insertion circuit board 380 is inserted into the groove 316 formed on the first magnetic sheet 312 and the groove 332 formed on the lower circuit board 330 to be located on the lower surface of the upper circuit board 320. In this time, the insertion circuit board 380 is located on the lower region of the third antenna 370, and is located so that the third lower radiation pattern 374 is located on the lower portion of the fourth upper radiation pattern 372.

The third lower radiation pattern 374 is composed of the horizontal winding type radiation pattern wound in the horizontal direction of the magnetic sheet 310. In this time, the third lower radiation pattern 374 is connected with the fourth upper radiation pattern 372 to constitute the third antenna 370.

In this time, the third antenna 370 is a magnetic induction type wireless power transmission antenna, such that the wireless power transmission efficiency is enhanced as the resistance reduces, and accordingly, the third antenna 370 is connected with the fourth upper radiation pattern 372 through the plurality of via holes 376.

The third antenna 370 has the fourth upper radiation pattern 372 and the third lower radiation pattern 374 connected through the plurality of via holes 376, thus minimizing the resistance and maximizing the wireless power transmission efficiency.

Meanwhile, the adhesion sheet 340 can be configured to include the first adhesion sheet 344 interposed between the upper circuit board 320 and the lower circuit board 330, the second adhesion sheet 346 interposed between the upper circuit board 320 and the insertion circuit board 380, and a third adhesion sheet 348 interposed between the insertion circuit board 380 and the second magnetic sheet 314.

The first adhesion sheet 344 is located along the edges of the upper circuit board 320 and the lower circuit board 330 to form the receiving space 342 in which the first magnetic sheet 312 is received.

The second adhesion sheet 346 is inserted into the groove 316 of the first magnetic sheet 312 and the groove 332 of the lower circuit board 330. The second adhesion sheet 346 is interposed between the upper circuit board 320 and the inserted circuit board 380 to adhere the lower surface of the upper circuit board 320 and the upper surface of the inserted circuit board 380.

The third adhesion sheet 348 is inserted into the groove 316 of the first magnetic sheet 312 and the groove 332 of the lower circuit board 330. The third adhesion sheet 348 is interposed between the insertion circuit board 380 and the second magnetic sheet 314 to adhere the lower surface of the insertion circuit board 380 and the upper surface of the second magnetic sheet 314.

As described above, the antenna module can connect the fourth upper radiation pattern 372 and the third lower radiation pattern 374 through the plurality of via holes, thus minimizing the resistance of the third antenna 370 to maximize the wireless power transmission efficiency and the transmission distance.

While the present disclosure has been described with respect to the preferred embodiments, it can be modified in various forms, and it will be apparent to those skilled in the art that various changes and modifications can be made without departing from the claims of the present disclosure.

The invention claimed is:
1. An antenna module, comprising:
a magnetic sheet having a first region, a second region, and a third region;
a first antenna resonating in a first frequency band, and located to be biased to the first region of the magnetic sheet; and a second antenna spaced apart from the first antenna to resonate in a second frequency band, and located to be biased to the third region of the magnetic sheet,
wherein the first antenna comprises
   a first circuit board where a first radiation pattern is located;
   a second circuit board where a second radiation pattern is located; and
   a first adhesion layer interposed between the first circuit board and the second circuit board,
wherein the first adhesion layer forms a receiving space formed in a pocket shape, the pocket shape having one side opened to receive the magnetic sheet, and
wherein the first region of the magnetic sheet inserted into the receiving space through the one side of the pocket shape.

* * * * *